(12) United States Patent
Conus et al.

(10) Patent No.: US 12,186,891 B2
(45) Date of Patent: Jan. 7, 2025

(54) INFORMATION PROCESSING DEVICE, INFORMATION PROCESSING METHOD, PROGRAM, AND ROBOT

(71) Applicant: SONY GROUP CORPORATION, Tokyo (JP)

(72) Inventors: William Alexandre Conus, Tokyo (JP); Yasuhiro Matsuda, Tokyo (JP); Noriaki Takasugi, Tokyo (JP); Yasunori Kawanami, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 422 days.

(21) Appl. No.: 17/632,446

(22) PCT Filed: Jul. 27, 2020

(86) PCT No.: PCT/JP2020/028617
§ 371 (c)(1),
(2) Date: Feb. 2, 2022

(87) PCT Pub. No.: WO2021/029205
PCT Pub. Date: Feb. 18, 2021

(65) Prior Publication Data
US 2022/0274261 A1 Sep. 1, 2022

(30) Foreign Application Priority Data
Aug. 9, 2019 (JP) .................................. 2019-147025

(51) Int. Cl.
*B25J 13/08* (2006.01)
*B25J 9/16* (2006.01)

(52) U.S. Cl.
CPC ........... *B25J 13/082* (2013.01); *B25J 9/1612* (2013.01); *B25J 9/163* (2013.01); *B25J 9/1653* (2013.01); *B25J 13/085* (2013.01)

(58) Field of Classification Search
CPC ........ B25J 13/082; B25J 9/1612; B25J 9/163; B25J 9/1653; B25J 13/085
See application file for complete search history.

(56) References Cited

U.S. PATENT DOCUMENTS

2009/0031825 A1 2/2009 Kishida
2016/0221193 A1* 8/2016 Sato ....................... B25J 13/085
(Continued)

FOREIGN PATENT DOCUMENTS

CN 102310409 A 1/2012
CN 107921621 A 4/2018
(Continued)

*Primary Examiner* — Behrang Badii
*Assistant Examiner* — Jay Khandpur
(74) *Attorney, Agent, or Firm* — Paratus Law Group, PLLC

(57) ABSTRACT

The present technology relates to an information processing device, an information processing method, a program, and a robot capable of estimate a value outside a detection range of a sensor. A control device of a first aspect of the present technology is a device that acquires detection results of a sensor unit composed of a plurality of sensors including a first sensor having a predetermined detection range, and a second sensor having a range in a detection range thereof in which detection by the first sensor is not possible and estimates a detected value of the first sensor outside the predetermined detection range on the basis of detection results of the second sensor. The present technology can be applied to a device that controls a robot having a hand part capable of gripping an object.

18 Claims, 21 Drawing Sheets

(56) References Cited

U.S. PATENT DOCUMENTS

| | | | |
|---|---|---|---|
| 2016/0373601 A1* | 12/2016 | Kuroishi | H04N 1/00891 |
| 2018/0339867 A1 | 11/2018 | Hasegawa | |
| 2018/0361576 A1 | 12/2018 | Sakai | |
| 2018/0364850 A1 | 12/2018 | Vosgueritchian et al. | |
| 2019/0176326 A1 | 6/2019 | Bingham | |
| 2019/0275672 A1* | 9/2019 | Takamatsu | G06N 5/048 |
| 2020/0306979 A1* | 10/2020 | Paulson | G01K 7/16 |
| 2020/0331486 A1* | 10/2020 | Wieczorek | B60R 1/26 |
| 2024/0017421 A1* | 1/2024 | McNelly | B25J 9/1633 |
| 2024/0131724 A1* | 4/2024 | Tsukamoto | G01L 5/165 |

FOREIGN PATENT DOCUMENTS

| | | | | |
|---|---|---|---|---|
| CN | 107921622 A | 4/2018 | | |
| JP | H04-009632 A | 1/1992 | | |
| JP | 2009066714 A | 4/2009 | | |
| JP | 6139806 B1 * | 5/2017 | | G06M 7/00 |
| JP | 2018017705 A | 2/2018 | | |
| JP | 2019-066325 A | 4/2019 | | |
| JP | 2019-517076 A | 6/2019 | | |

* cited by examiner

INFORMATION PROCESSING DEVICE, INFORMATION PROCESSING METHOD, PROGRAM, AND ROBOT

CROSS REFERENCE TO PRIOR APPLICATION

This application is a National Stage Patent Application of PCT International Patent Application No. PCT/JP2020/028617 (filed on Jul. 27, 2020) under 35 U.S.C. § 371, which claims priority to Japanese Patent Application No. 2019-147025 (filed on Aug. 9, 2019), which are all hereby incorporated by reference in their entirety.

TECHNICAL FIELD

The present technology relates to an information processing device, an information processing method, a program, and a robot, and more particularly, to an information processing device, an information processing method, a program, and a robot configured to be able to estimate a value outside a detection range of a sensor.

BACKGROUND ART

There is a need for a robot hand that can stably grip various objects with different properties such as weight and durability, such as light and fragile objects and heavy and hard-to-break objects. In order to deal with a wide range of properties, it is necessary to accurately detect a pressure applied to the contact surface between the robot hand and an object using a sensor having a wide detection range.

For example, PTL 1 discloses a technology for stacking a strain gauge (force sensor) and a pressure sensor under a touch screen and switching operating sensors.

CITATION LIST

Patent Literature

[PTL 1]
U.S. Patent Application Publication No. 2018/0364850 (Specification)

SUMMARY

Technical Problem

However, it is difficult to accurately detect values outside a detection range without switching sensors.

The present technology has been made in view of such a situation, and makes it possible to estimate values outside a detection range of a sensor.

Solution to Problem

A control device of a first aspect of the present technology includes an acquisition unit configured to acquire detection results of a sensor unit composed of a plurality of sensors including a first sensor having a predetermined detection range, and a second sensor having a range in a detection range thereof in which detection by the first sensor is not possible, and an estimation unit configured to estimate detection values of the first sensor outside the predetermined detection range on the basis of detection results of the second sensor.

A robot of a second aspect of the present technology includes a hand part capable of gripping an object, a sensor unit composed of a plurality of sensors including a first sensor having a predetermined detection range, and a second sensor having a range in a detection range thereof in which detection by the first sensor is not possible and provided in the hand part, and an estimation unit configured to estimate detection values of the first sensor outside the predetermined detection range on the basis of detection results of the second sensor.

In the present technology, a detected value of the first sensor outside the predetermined detection range is estimated on the basis of a detection result of the second sensor having a range in a detection range thereof in which detection by the first sensor is not possible.

DESCRIPTION OF EMBODIMENTS

Figure 1:
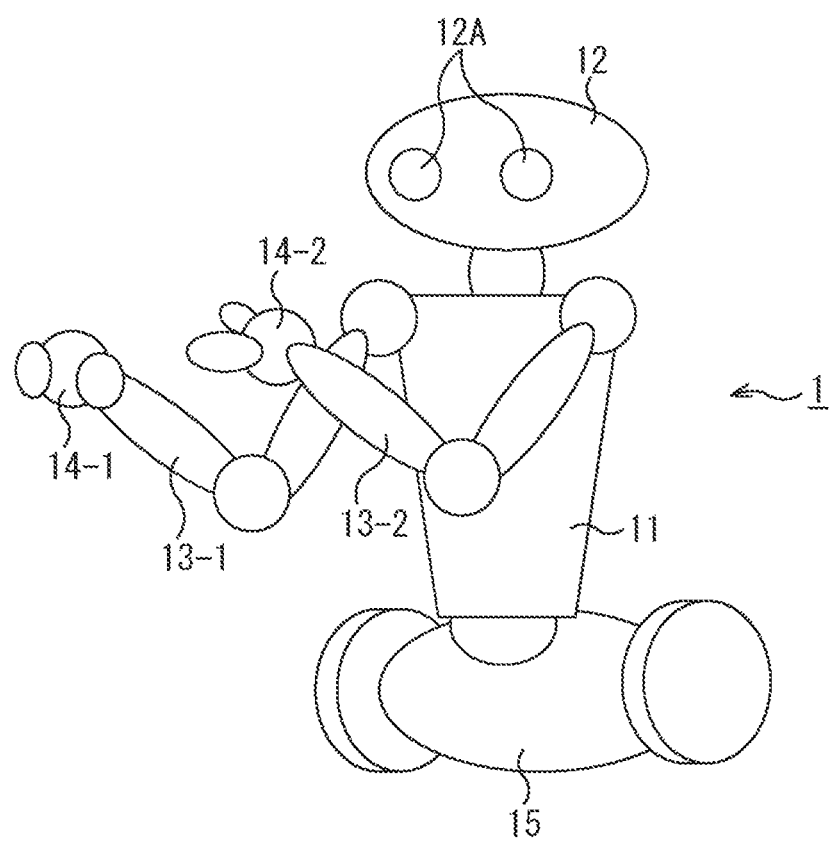
FIG. 1 is a diagram showing a configuration example of an appearance of a robot according to an embodiment of the present technology.

Hereinafter, embodiments of the present technology will be described. Note that the description will be given in the following order.
1. Gripping function of robot
2. Estimation of detected values 3. Configuration of robot
4. Operation of control device
5. Example using prediction model
6. Modified examples

1. Gripping Function of Robot

FIG. 1 is a diagram showing a configuration example of an appearance of a robot according to an embodiment of the present technology.

As shown in FIG. 1, a robot 1 is a robot having a humanoid upper body and having a moving mechanism using wheels. A flat spherical head part 12 is provided on a body part 11. Two cameras 12A are provided on the front surface of the head part 12 in a shape imitating the human eyes.

Arm parts 13-1 and 13-2 composed of a manipulator having multiple degrees of freedom are provided at the upper end of the body part 11. Hand parts 14-1 and 14-2 are provided at the tips of the arm parts 13-1 and 13-2, respectively. The robot 1 has a function of gripping an object by the hand parts 14-1 and 14-2.

Hereinafter, when it is not necessary to distinguish between the arm parts 13-1 and 13-2 as appropriate, they are collectively referred to as arm parts 13. When it is not necessary to distinguish between the hand parts 14-1 and 14-2, they are collectively referred to as hand parts 14. Other components provided in pairs will also be referred to collectively as appropriate.

A carriage-shaped moving body part 15 is provided at the lower end of the body part 11. The robot 1 can move by rotating wheels provided on the left and right sides of the moving body part 15 and changing the direction of the wheels.

In this manner, the robot 1 can perform coordinated movements of the whole body, such as freely lifting and transporting an object in a three-dimensional space while gripping the object with the hand parts 14.

As shown in FIG. 1, the robot 1 may be configured as a single-armed robot (having one hand part 14) instead of a double-armed robot. Further, the body part 11 may be provided on legs instead of the carriage (moving body part 15).

Figure 2:
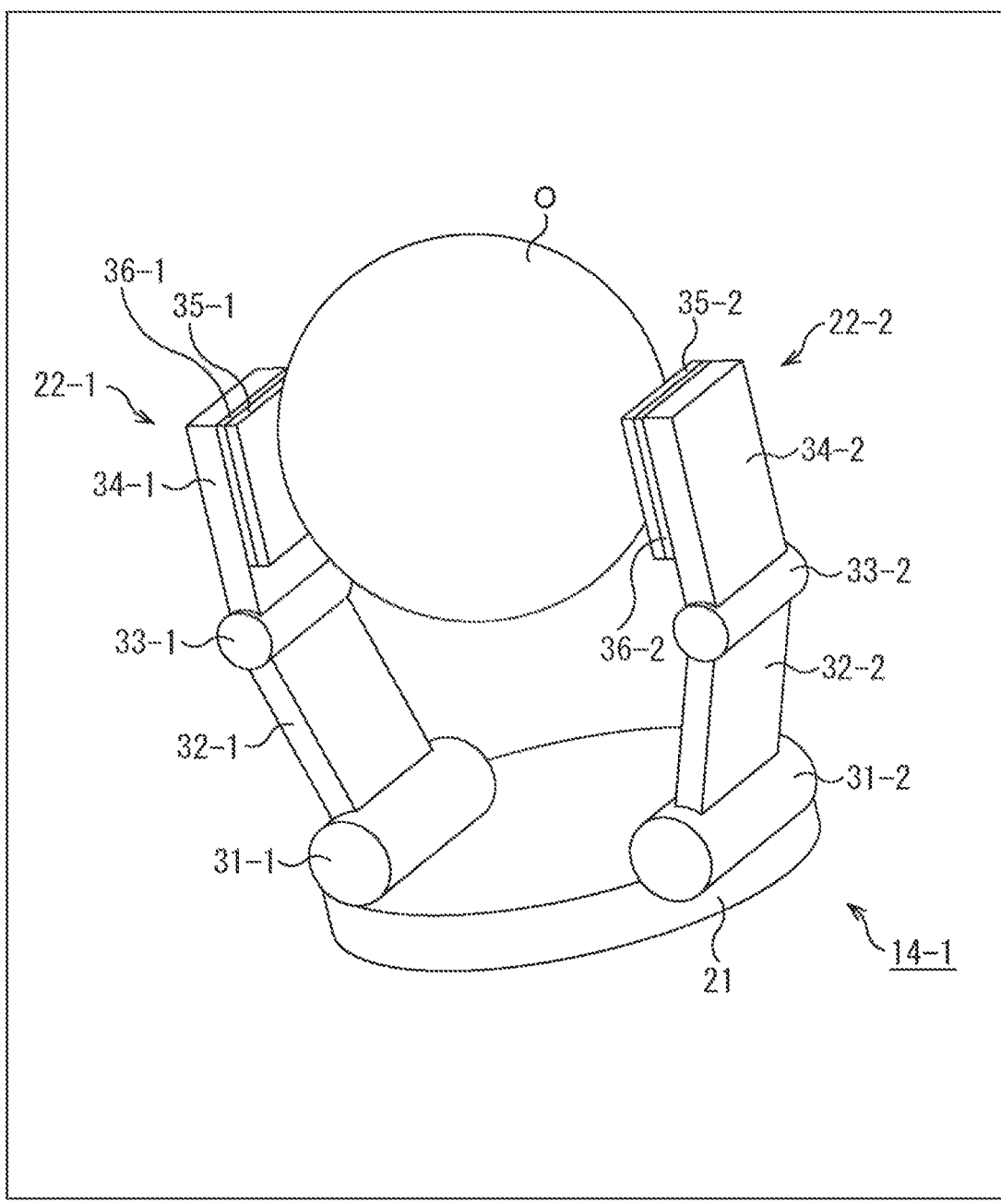
FIG. 2 is an enlarged view showing a hand part.

FIG. 2 is an enlarged view showing a hand part 14-1.

As shown in FIG. 2, the hand part 14-1 is a two-finger gripper type gripping part. Finger parts 22-1 and 22-2 constituting two finger parts 22 on the outer side and the inner side are attached to a base part 21.

The finger part 22-1 is connected to the base part 21 via a joint part 31-1. The joint part 31-1 is provided with a plate-shaped part 32-1 having a predetermined width, and a joint part 33-1 is provided at the tip of the plate-shaped part 32-1. A plate-shaped part 34-1 is provided at the tip of the joint part 33-1. The cylindrical joint parts 31-1 and 33-1 have a predetermined range of motion.

The finger part 22-2 also has the same configuration as the finger part 22-1. That is, a joint part 31-2 is provided with a plate-shaped part 32-2 having a predetermined width, and a joint part 33-2 is provided at the tip of the plate-shaped part 32-2. A plate-shaped part 34-2 is provided at the tip of the joint part 33-2. The cylindrical joint parts 31-2 and 33-2 have a predetermined range of motion.

By moving each joint part, the fingers 22-1 and 22-2 open and close. An object is gripped so as to be sandwiched between the inner side of the plate-shaped part 34-1 provided at the tip of the finger part 22-1 and the inner side of the plate-shaped part 34-2 provided at the tip of the finger part 22-2.

In the example of FIG. 2, a spherical object O is gripped.

As shown in FIG. 2, a thin plate-shaped pressure distribution sensor 35-1 is provided on an inner side the plate-shaped part 34-1 of the finger part 22-1. Further, a thin plate-shaped pressure distribution sensor 35-2 is provided on an inner side the plate-shaped part 34-2 of the finger part 22-2.

When the object O is gripped, the pressure distribution sensor 35 (pressure distribution sensors 35-1 and 35-2) detects a pressure distribution on the contact surface between the hand part 14 and the object O.

Figure 3:
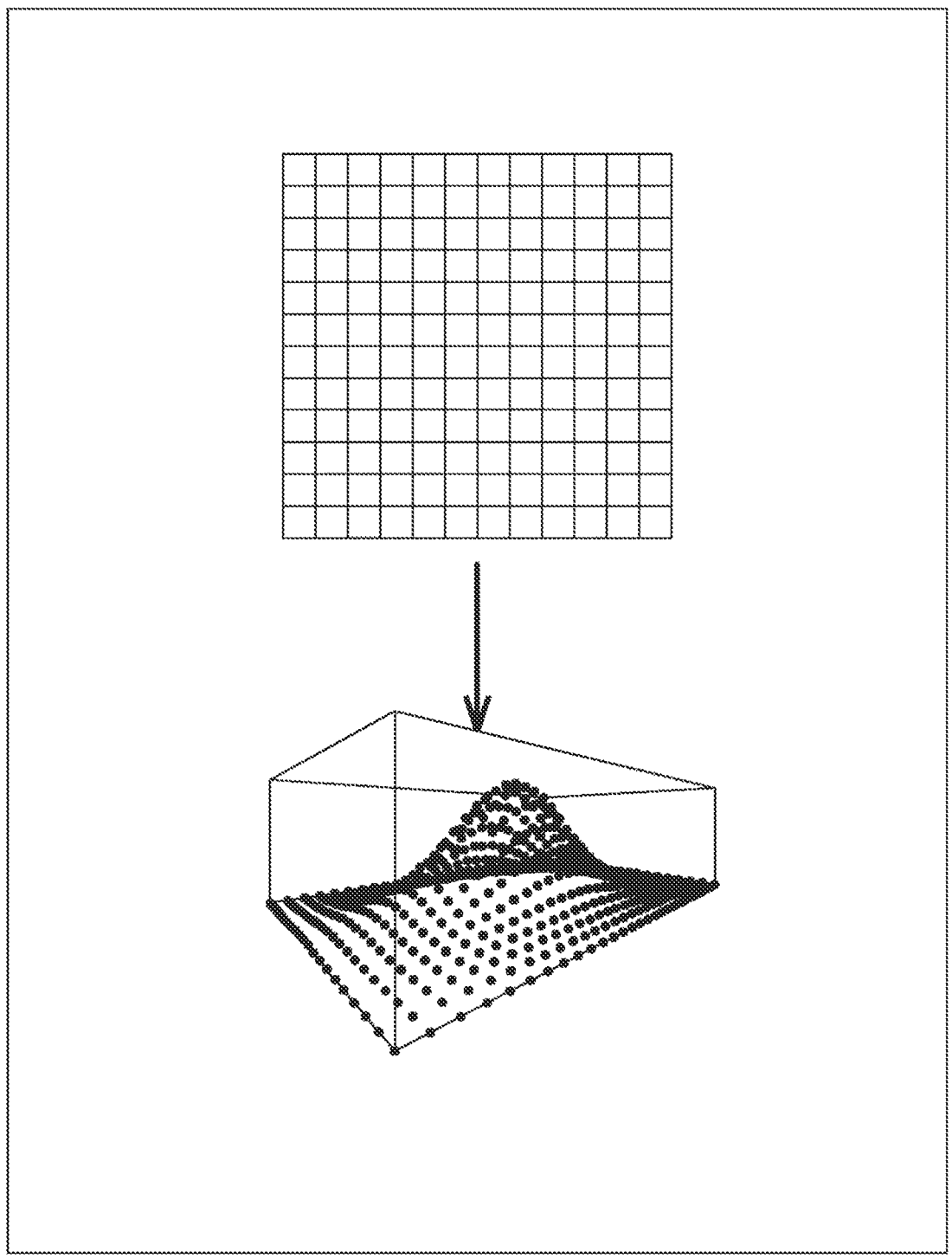
FIG. 3 is a diagram showing an example of a pressure distribution detected by a pressure distribution sensor.

FIG. 3 is a diagram showing an example of a pressure distribution detected by the pressure distribution sensor 35.

As shown in the upper part of FIG. 3, the surface of the approximately square pressure distribution sensor 35 is divided into a plurality of rectangular cells. When the object O is gripped by the hand part 14, for example, a pressure in each cell is detected and a pressure distribution on the entire surface of the pressure distribution sensor 35 is detected on the basis of the detected value of the pressure in each cell.

As shown at the tip of the arrow in FIG. 3, the distribution of the pressure applied to the entire surface of the pressure distribution sensor 35 may be represented by, for example, points in a three-dimensional space. In the example of FIG. 3, each black point represents the detected value of the pressure detected in each cell on the surface of the pressure distribution sensor 35.

When the hand part 14 grips the spherical object O, a pressure distribution in which the pressure applied to the center of the pressure distribution sensor 35 is highest and the pressure becomes lower in a curved manner with decreasing distance to the end of the pressure distribution sensor 35 is detected, as shown at the tip of the arrow in FIG. 3.

Returning to description of FIG. 2, a thin plate-shaped intermediate mounting plate 36-1 is provided between the plate-shaped part 34-1 and the pressure distribution sensor 35-1. Further, a thin plate-shaped intermediate mounting plate 36-2 is provided between the plate-shaped part 34-2 of the finger part 22-2 and the pressure distribution sensor 35-2.

A force sensor is provided on an inner side the plate-shaped part 34 (plate-shaped parts 34-1 and 34-2). The intermediate mounting plate 36 (intermediate mounting plates 36-1 and 36-2) sandwiched between the force sensor and the pressure distribution sensor 35 functions as mounting part for connecting the sensors to each other. The internal configuration of the plate-shaped part 34 will be described later with reference to FIG. 4.

The same configuration as that of the hand part 14-1 as described above is also provided in the hand part 14-2.

Although the hand part 14 is a two-finger type gripping part, a multi-finger type gripping part having a different number of fingers, such as a three-finger type and a five-finger type, may be provided.

Figure 4:
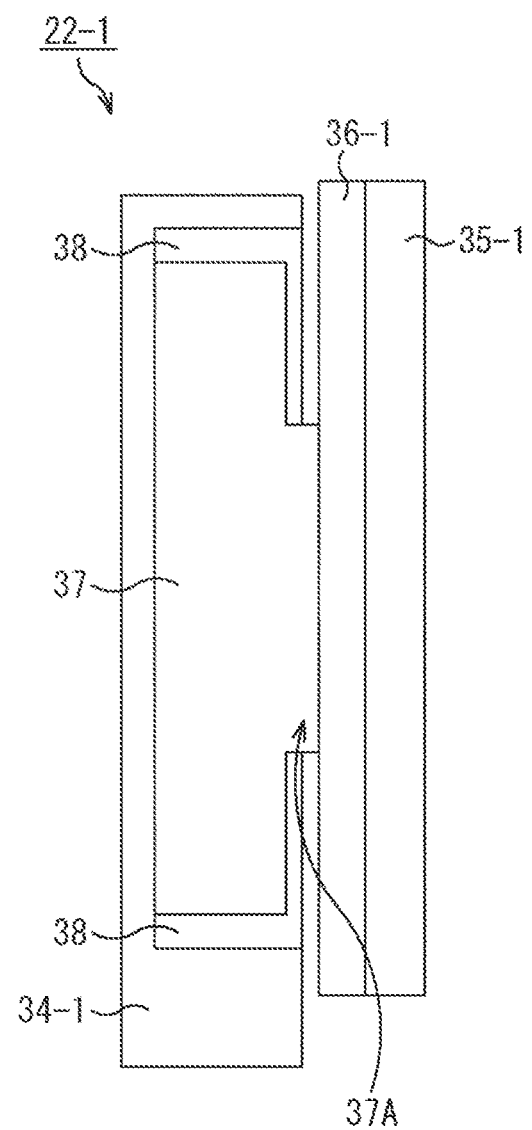
FIG. 4 is an enlarged cross-sectional view showing a part of a tip of a finger part.

FIG. 4 is an enlarged cross-sectional view showing a part of the tip of the finger part 22-1.

As shown in FIG. 4, a force sensor 37 having a convex cross section is provided on the back side of the pressure distribution sensor 35-1 with the intermediate mounting plate 36-1 interposed therebetween. A raised portion 37A of the force sensor 37 is coupled to the back surface of the intermediate mounting plate 36-1. The intermediate mounting plate 36-1 is mounted to facilitate coupling between the sensors. The pressure distribution sensor 35-1 and the force sensor 37 may be directly coupled.

The force sensor 37 is provided on the back side of the pressure distribution sensor 35-1 so as to be stacked on the pressure distribution sensor 35-1.

Therefore, when the object O is gripped, not only a pressure distribution is detected by the pressure distribution sensor 35-1 but also the force applied to the entire contact surface between the hand part 14 and the object O is detected by the force sensor 37. The force sensor 37 has a force range in a detection range thereof in which detection by each cell of the pressure distribution sensor 35-1 is not possible.

In this manner, the pressure distribution sensor 35-1 and the force sensor 37 provided in a stacked state constitute a sensor unit that detects the force applied to the contact surface between the hand part 14 and the object O. A plurality of pressure distribution sensors and a plurality of force sensors may be stacked to form a sensor unit. Any type of sensor constituting the sensor unit can be used as long as it can detect force.

The force applied to the entire contact surface between the hand part 14 and the object O may be detected by a 1-axis, 3-axis, or 6-axis force sensor. The 1-axis force sensor is a force sensor that detects a force in a Z direction, and the 3-axis force sensor is a force sensor that detects a force in XYZ directions. The 6-axis force sensor is a force sensor that detects a force in the XYZ directions and a moment in MxMyMz directions.

As shown in FIG. 4, a rib 38 having a hook-shaped cross section, which is a reinforcer, is provided on the surface side (right side of FIG. 4) of the force sensor 37 so as to cover a portion other than the raised portion 37A. A predetermined gap is formed between the surface of the rib 38 and the intermediate mounting plate 36-1.

When a predetermined moment is applied to the hand part 14, the intermediate mounting plate 36-1 is deformed by bending and hits the rib 38 before the moment applied to the force sensor 37 reaches a capacity moment.

The force sensor 37 has a capacity moment, which is a limit value, determined by specifications. The gap formed between the intermediate mounting plate 36-1 and the rib 38 and the rib 38 itself can buffer the moment applied to the force sensor 37 and prevent the force sensor 37 from failing.

In this manner, the robot 1 can grip the object O with an appropriate force adjustment by controlling the hand part 14 on the basis of detection results of the pressure distribution sensor 35 and the force sensor 37 provided at the tip of the finger part 22.

The same configuration as that for the finger part 22-1 as described above is provided in the finger part 22-2, for example. A pressure distribution sensor or force sensor having detection ranges different from the detection ranges of the pressure distribution sensor 35 and the force sensor 37 provided on the finger part 22-1 may be provided on the finger part 22-2. Here, a detection range indicates a range of values that can be detected by a sensor that can detect a specific type of values, and "outside the detection range" indicates a non-detection range within the specific type of values.

The pressure distribution sensor 35 and the force sensor 37 may be provided only on the side of the finger part 22-1 and may not be provided on the side of the finger part 22-2 paired with the finger part 22-1.

2. Estimation of Detected Values

The pressure distribution sensor 35 (each cell of the pressure distribution sensor 35) and the force sensor 37 have different detection ranges. For example, the force sensor 37 may have a range wider than the detection range of the pressure distribution sensor 35 as a detection range. The detection range of the force sensor 37 includes at least a range outside the detection range of the pressure distribution sensor 35.

When a detected value of an upper or lower limit of the detection range is detected by the pressure distribution sensor 35, a detected value of the pressure distribution sensor 35 outside the detection range is estimated on the basis of detection results of the force sensor 37 in the robot 1.

Figure 5:
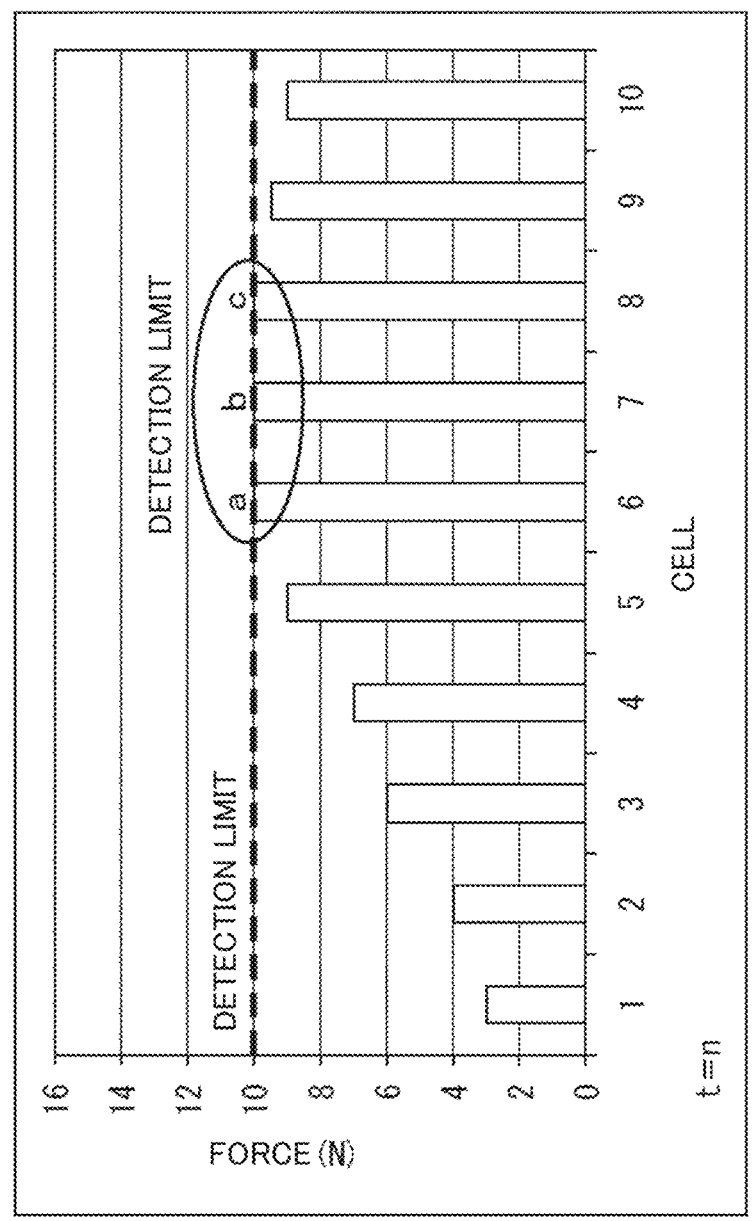
FIG. 5 is a diagram showing an example of a pressure distribution detected by a pressure distribution sensor.

FIG. 5 is a diagram showing an example of a pressure distribution detected by the pressure distribution sensor 35.

In the example of FIG. 5, a pressure distribution detected by the pressure distribution sensor 35 is represented by a two-dimensional graph. Hereinafter, the pressure distribution detected by the pressure distribution sensor 35 will be described using the two-dimensional graph.

The vertical axis of FIG. 5 represents a force (N). A force value represented as a detected value of each cell is a value obtained on the basis of a detected value of each cell of the pressure distribution sensor 35. On the other hand, the horizontal axis in FIG. 5 represents a cell. FIG. 5 represents detected values of cells 1 to 10.

The graph of FIG. 5 represents a pressure distribution at time t=n at which a detected value of the upper limit of the detection range of the pressure distribution sensor 35 is detected. As represented by an ellipse, detected values a, b, and c of cells 6 to 8 are detected as 10 N by applying a force exceeding the upper limit of 10 N. Practically, it is conceivable that a force of 10 N or more be applied to cells 6 to 8.

In cells 1 to 5, cell 9, and cell 10, values less than 10 N that is the upper limit of the detection range are detected. The total of the detected values less than the upper limit of the detection range is, for example, 47.5 N.

When a force exceeding the upper limit outside the detection range is applied to cells 6 to 8, actual detected values of cells 6 to 8 are estimated on the basis of detection results of the force sensor 37 and time-series data of a detected value of each cell of the pressure distribution sensor 35.

For example, when detected values higher than a threshold value are detected by one or more cells of the pressure distribution sensor 35, a detected value of each cell of the pressure distribution sensor 35 at each time is stored as time-series data. A detected value, which is a first threshold value for starting storage of time-series data, is preset as a value lower than the upper limit of the detection range of the pressure distribution sensor 35.

A value obtained by subtracting a predetermined value from the upper limit of the detection range is set as the threshold value. Further, a value proportional to the upper limit of the detection range may be set, such as a value of 99% of the upper limit. The upper limit of the detection range of the pressure distribution sensor 35 is set on the basis of the specifications of the pressure distribution sensor 35. A predetermined value within the range of the specifications may be set as the upper limit of the detection range of the pressure distribution sensor 35.

When the upper limit of the ideal detection range differs in each cell of the pressure distribution sensor 35 due to specifications and errors, the upper limit or the threshold value of the detection range may be set as different values for respective cells.

The time-series data stored in this manner is used to estimate the actual force applied to cells 6 to 8 which has reached the upper limit of the detection range.

Figure 6:
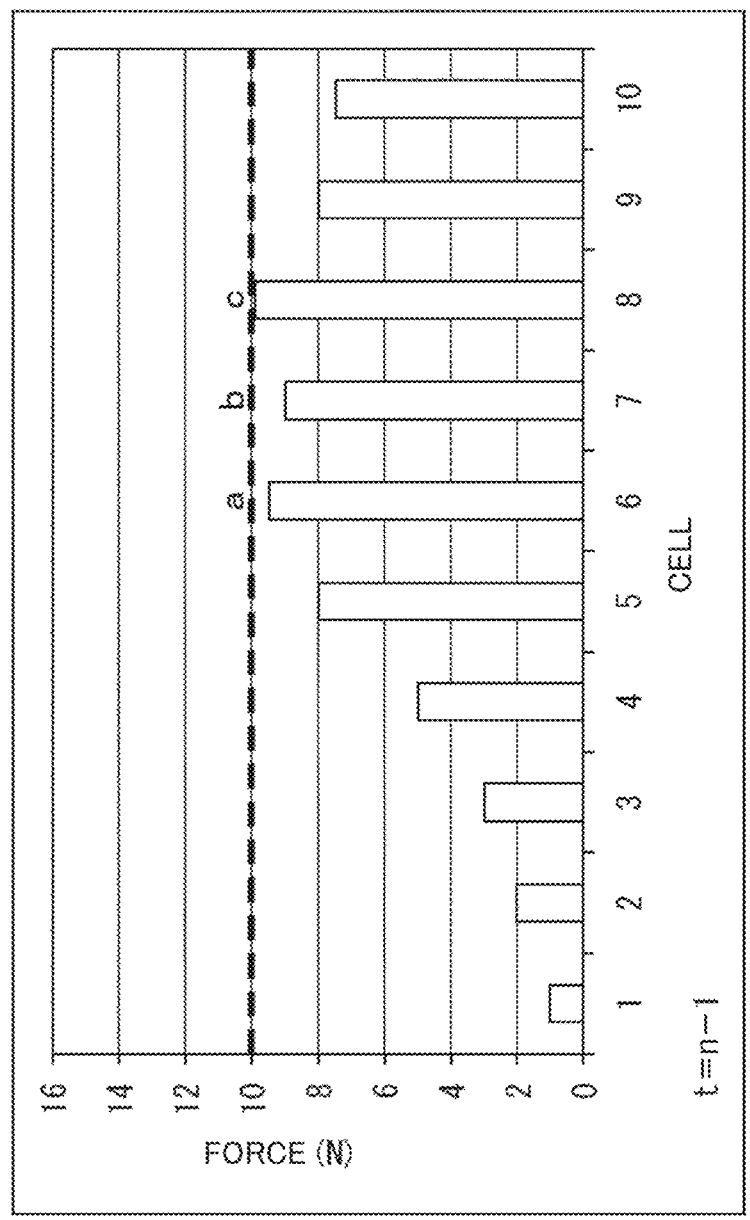
FIG. 6 is a diagram showing an example of a force distribution at time t=n−1.

FIG. 6 is a diagram showing an example of a force distribution at time t=n−1.

The graph of FIG. 6 represents a pressure distribution at a time one hour before the time t=n at which the pressure distribution described with reference to FIG. 5 was detected.

In the example of FIG. 6, it is assumed that 9.9 N, which is a detected value of 99% of 10 N that is the upper limit of the detection range of the pressure distribution sensor 35, is set as the threshold value. Among cells 1 to 10, a detected value of cell 8 is equal to or greater than the threshold value. Detected values of cells 1 to 7, cell 9, and cell 10 are less than the threshold value.

At time t=n−1 at which the detected value of cell 8 becomes equal to or greater than the threshold value, storage of the detected values of each cell of the pressure distribution sensor 35 is started. Time-series data composed of the stored detected values is used to estimate the forces applied to cells 6 to 8 (FIG. 5) which exceed the upper limit at time t=n.

Specifically, the robot 1 sets the detected value of cell 8 that first exceeds the threshold value as a reference value (1.0) and calculates ratios of the detected values of cell 6 and cell 7 to the reference value on the basis of the detected values at time t=n−1.

Assuming that the detected value of cell 6 is a, the detected value of cell 7 is b, and the detected value of cell 8 is c, a=0.96c and b=0.91c are obtained in the example of FIG. 6.

Further, the robot 1 estimates detected values of cells 6 to 8 at time t=n on the basis of the detection result of the force sensor 37 at time t=n and the detected values of cells 6 to 8 represented with reference to cell 8 as described above.

Here, it is assumed that the detection result of the force sensor 37 at time t=n is 90 N.

In this case, the robot 1 subtracts 47.5 N, which is the total of the detected values less than the upper limit of the detection range of the pressure distribution sensor 35, from 90 N, which is the detection result of the force sensor 37. The value obtained by subtraction is the sum of the forces applied to cells 6 to 8 which exceed the upper limit. Here, the total force applied to cells 6 to 8 is 42.5 N.

The robot 1 estimates the forces applied to cells 6 to 8 at time t=n according to the ratio of the detected value of each cell since the total of the detected value a of cell 6, the detected value b of cell 7, and the detected value c of cell 8 is 42.5 N. The robot 1 estimates the forces applied to cells 6 to 8 at time t=n on the basis of the following three formulas.

$$a=0.96c$$

$$b=0.91c$$

$$a+b+c=42.5$$

Figure 7:
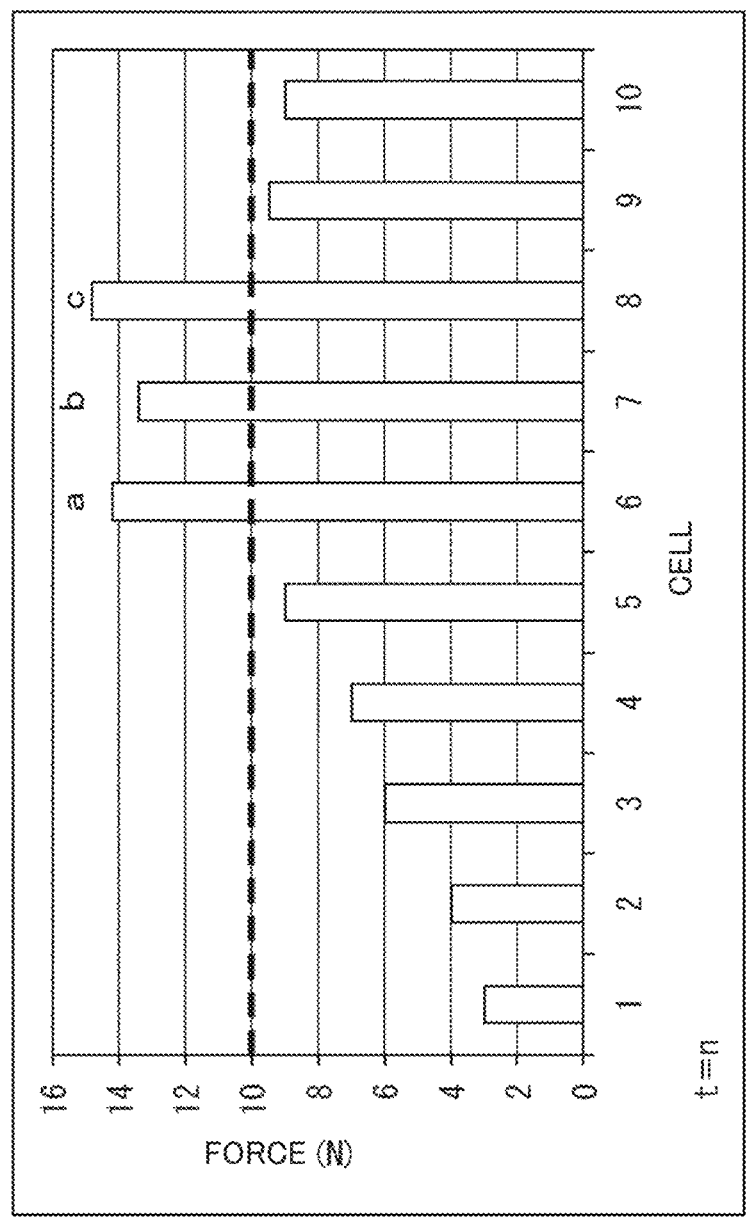
FIG. 7 is a diagram showing an example of an estimation result of a force distribution at time t=n.

FIG. 7 is a diagram showing an example of an estimation result of a force distribution at time t=n.

As shown in FIG. 7, the detected value a of cell 6, the detected value b of cell 7, and the detected value of cell 8 are estimated to be about 14.2 N, 13.5 N, and 14.8 N, respectively. The ratios of the detected values of cells 6 to 8 at time t=n are estimated using the same ratios as the ratios of the detected values of cells 6 to 8 at time t=n−1.

As detected values of cells 1 to 5, cell 9, and cell 10 which have not reached the upper limit of the detection range, values actually detected by the pressure distribution sensor 35 are used as they are.

As described above, detected values outside the detection range of the pressure distribution sensor 35 are estimated on the basis of time-series data of detected values of the pressure distribution sensor 35 and a detection result of the force sensor 37.

The force sensor 37 has a shorter detection cycle and a smaller amount of data processing than the pressure distribution sensor, in general. Therefore, the amount of calculation can be reduced as compared to a case of using different pressure distribution sensors and delay can be curbed by using high-frequency data.

The robot 1 can stably grip various objects having different properties such as weight and durability by controlling the hand part 14 on the basis of a result of estimation of detected values outside the detection range of the pressure distribution sensor 35.

The robot 1 can safely grip an object by controlling the hand part 14 on the basis of a result of estimation of detected values of the pressure distribution sensor 35 even when a situation conceived not to occur under normal usage conditions, such as a sudden application of a strong external force outside the detection range of the pressure distribution sensor 35, occurs.

3. Configuration of Robot

Configuration of Hardware

Figure 8:
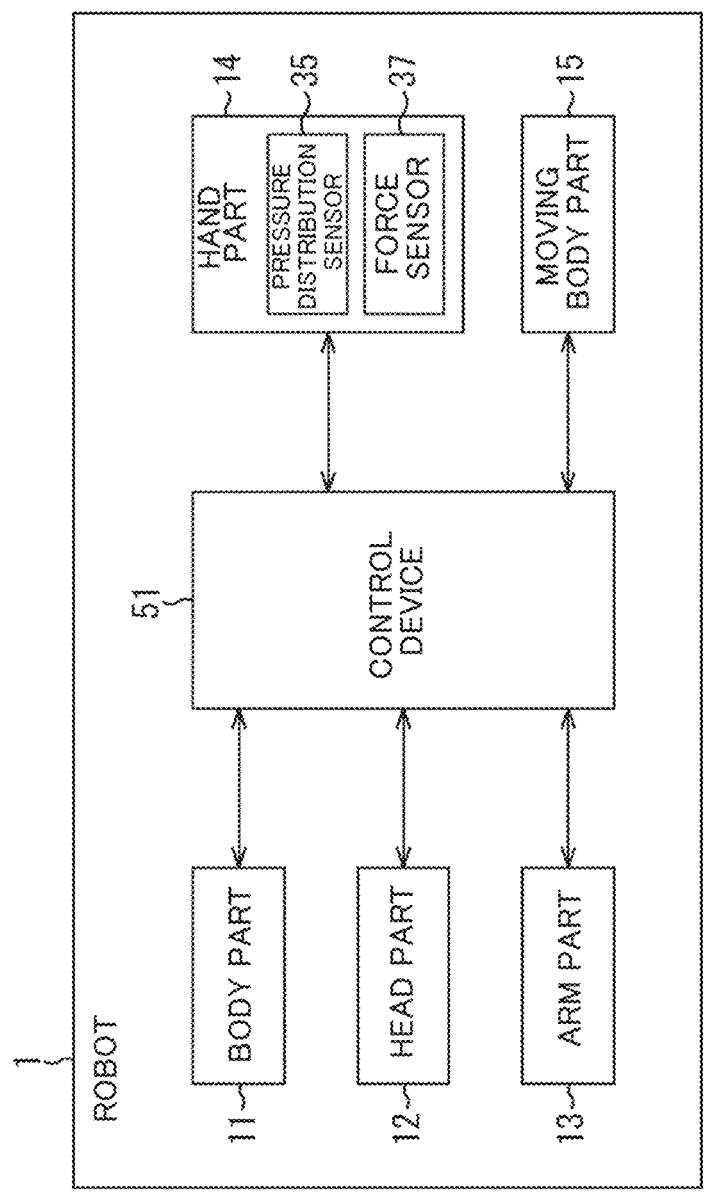
FIG. 8 is a block diagram showing a hardware configuration example of a robot.

FIG. 8 is a block diagram showing a hardware configuration example of the robot 1

As shown in FIG. 8, the robot 1 is composed of components provided in the body part 11, the head part 12, the arm parts 13, the hand parts 14, and the moving body part 15 which are connected to a control device 51.

The control device 51 is composed of a computer having a central processing unit (CPU), a read only memory (ROM), a random access memory (RAM), a flash memory, and the like. The control device 51 may be housed in, for example, the body part 11. The control device 51 executes a predetermined program by the CPU and controls the overall operation of the robot 1.

The control device 51 recognizes the environment around the robot 1 on the basis of a detection result of a sensor, an image captured by a camera, and the like and plans an action according to the recognition result. Various sensors and cameras are provided in each of the body part 11, the head part 12, the arm parts 13, the hand parts 14, and the moving body part 15. Further, the hand part 14 is provided with the pressure distribution sensor 35 and the force sensor 37.

The control device 51 generates a task for realizing a predetermined action and performs a whole body operation on the basis of the generated task. For example, the arm parts 13 may be operated while an object is gripped such that the object is moved, or the moving body part 15 may be operated while an object is gripped such that the object is carried.

Further, when the detected value of the upper limit or the lower limit of the detection range of the pressure distribution sensor 35 is detected by the pressure distribution sensor 35, the control device 51 estimates detected values outside the detection range of the pressure distribution sensor 35 as described above.

For example, the control device 51 may control the hand part 14 on the basis of a distribution of force applied to the contact surface between the hand part 14 and an object O including the estimated detected values and grip the object O according to appropriate force adjustment.

Figure 9:
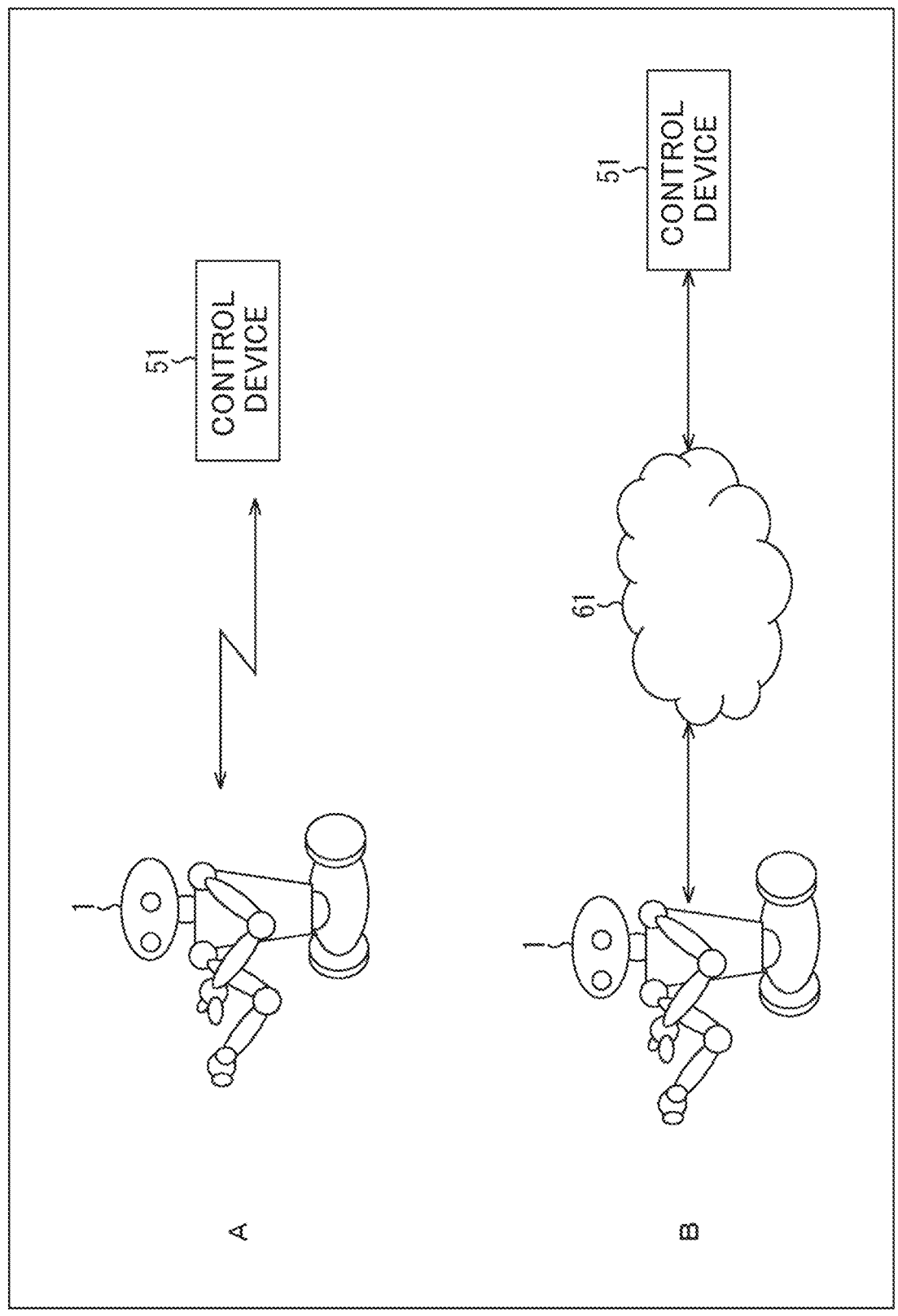
FIG. 9 is a diagram showing a configuration example of a control system.

FIG. 9 is a diagram showing a configuration example of a control system.

The control system shown in FIG. 9 is constructed by providing the control device 51 as an external device of the robot 1. In this manner, the control device 51 may be provided outside the housing of the robot 1.

Wireless communication of a predetermined standard such as wireless LAN or Long Term Evolution (LTE) is performed between the robot 1 and the control device 51 in FIG. 9.

Various types of information such as information indicating the state of the robot 1 and information indicating a detection result of a sensor are transmitted from the robot 1 to the control device 51. Information for controlling the operation of the robot 1, and the like are transmitted from the control device 51 to the robot 1.

The robot 1 and the control device 51 may be directly connected as shown in A of FIG. 9 or may be connected via a network 61 such as the Internet as shown in B of FIG. 9. Operations of a plurality of robots 1 may be controlled by one control device 51.

Functional Configuration

Figure 10:
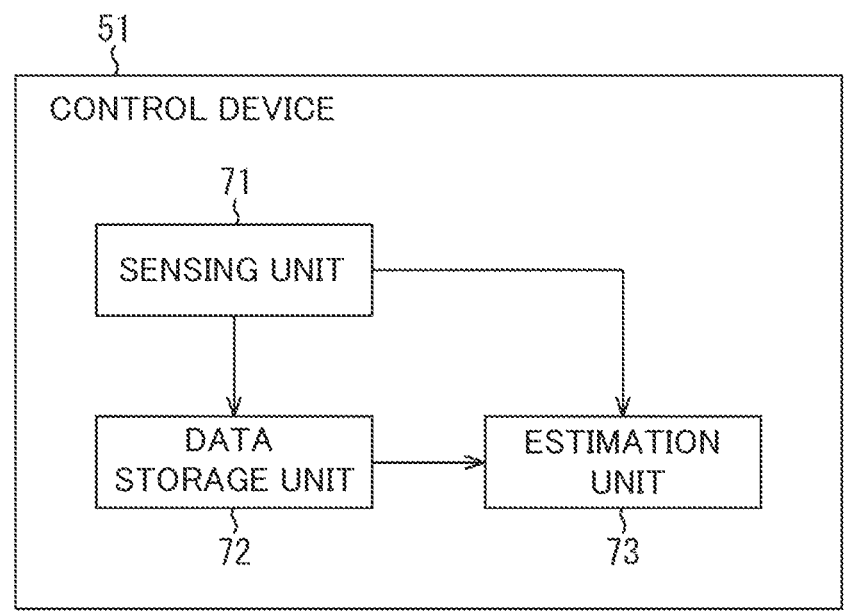
FIG. 10 is a block diagram showing a functional configuration example of a control device.

FIG. 10 is a block diagram showing a functional configuration example of the control device 51.

At least a part of functional units shown in FIG. 10 is realized by executing a predetermined program by the CPU of the control device 51.

As shown in FIG. 10, a sensing unit 71, a data storage unit 72, and an estimation unit 73 are realized in the control device 51.

The sensing unit 71 acquires a detection result of the pressure distribution sensor 35 and a detection result of the force sensor 37. The sensing unit 71 serves as an acquisition unit that acquires a detection result from the sensor unit. The operation of the hand part 14 is controlled on the basis of a detection result acquired by the sensing unit 71.

When the pressure distribution sensor 35 detects a value higher than the threshold value, the sensing unit 71 outputs the detection result of the pressure distribution sensor 35 to the data storage unit 72. The data storage unit 72 stores the detection result of the pressure distribution sensor 35 supplied from the sensing unit 71 as time-series data.

Along with the detection result of the pressure distribution sensor 35, a detection result of the force sensor 37 may be output from the sensing unit 71 to the data storage unit 72 and stored therein. In this case, the detection result of the force sensor 37 stored as time-series data is used to estimate detected value of the pressure distribution sensor 35 outside the detection range.

When the pressure distribution sensor 35 detects a detected value that is the upper or lower limit of the detection range, the sensing unit 71 outputs the detection result of the pressure distribution sensor 35 and the detection result of the force sensor 37 to the estimation unit 73.

The sensing unit 71 stops the operation of the force sensor 37 unless a detected value that is the upper limit or the lower limit of the detection range is detected by the pressure distribution sensor 35. The sensing unit 71 also has a function of controlling the operation of the force sensor 37. Power consumption can be reduced by stopping the operation of the force sensor 37.

Instead of stopping the operation of the force sensor 37 until a detected value that is the upper or lower limit of the detection range is detected, the operation of the force sensor 37 may be stopped until a detected value higher than a threshold value set as a value lower than the upper limit of the detection range is detected or until a detected value lower than a threshold value set as a value higher than the lower limit of the detection range is detected.

When the detected value that is the upper limit or the lower limit of the detection range is detected by the pressure distribution sensor 35, the estimation unit 73 acquires time-series data of the detected value of the pressure distribution sensor 35 from the data storage unit 72.

The estimation unit 73 estimates detected values of the pressure distribution sensor 35 outside the detection range on the basis of the detection result of the pressure distribution sensor 35 supplied from the sensing unit 71, the detection result of the force sensor 37, and the time-series data acquired from the data storage unit 72. The operation of the hand part 14 is controlled on the basis of the detected values estimated by the estimation unit 73.

4. Operation of Control Device

The operation of the control device 51 having the above configuration will be described.

Figure 11:
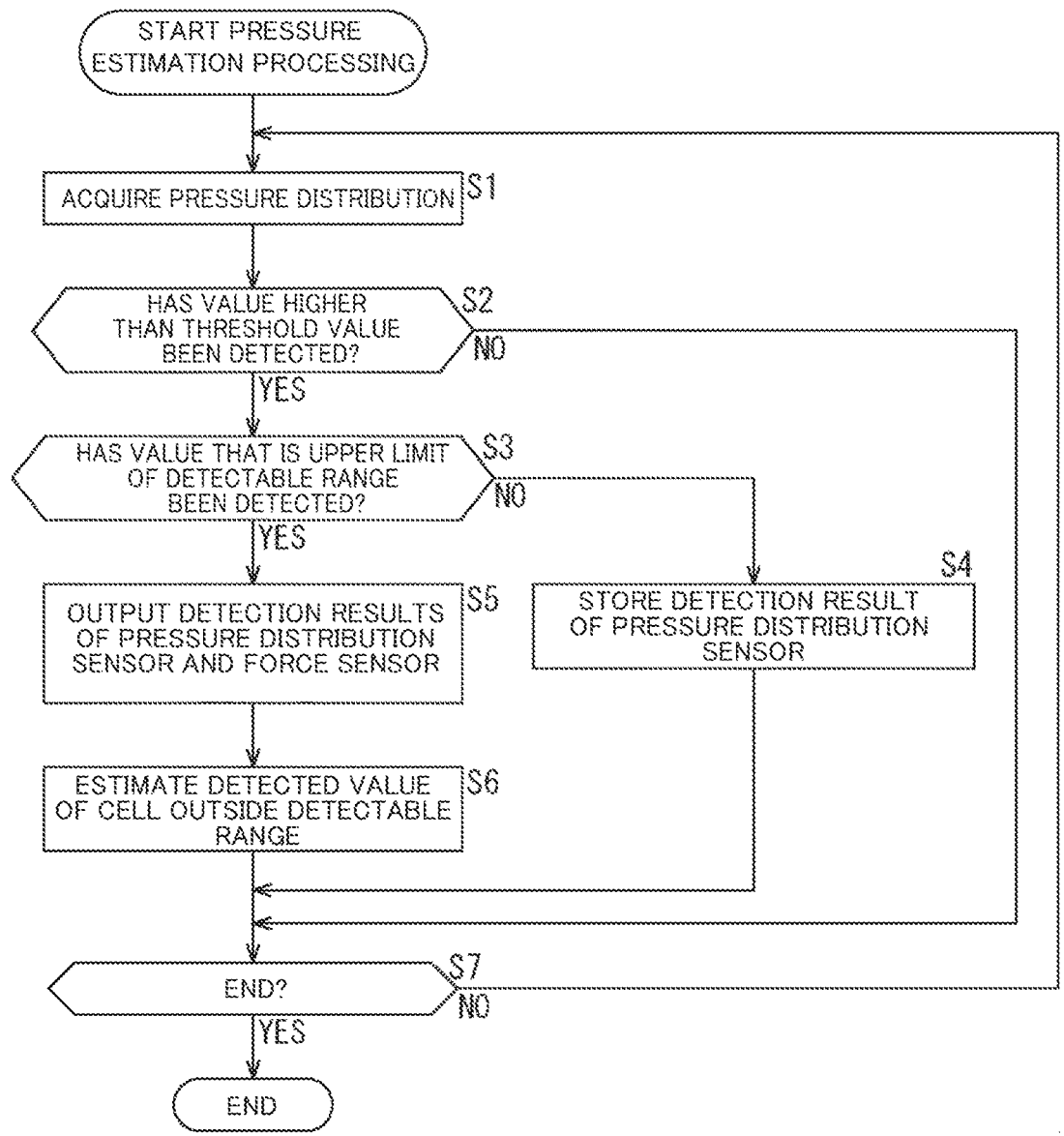
FIG. 11 is a flowchart illustrating pressure estimation processing of the control device.

Pressure estimation processing of the control device 51 will be described with reference to the flowchart of FIG. 11. Here, processing of estimating a detected value of the pressure distribution sensor 35 higher than the upper limit of the detection range will be described.

In step S1, the sensing unit 71 acquires a pressure distribution that is a detection result of the pressure distribution sensor 35.

In step S2, the sensing unit 71 determines whether a value higher than the threshold value is detected by the pressure distribution sensor 35.

If it is determined that a value higher than the threshold value is detected by the pressure distribution sensor 35 in step S2, processing proceeds to step S3.

In step S3, the sensing unit 71 determines whether a value that is the upper limit of the detection range has been detected.

If it is determined that a value that is the upper limit of the detection range has not been detected in step S3, processing proceeds to step S4.

In step S4, the sensing unit 71 outputs a detection result of the pressure distribution sensor 35 as time-series data to the data storage unit 72 and stores the time-series data therein.

On the other hand, if it is determined that a value that is the upper limit of the detection range has been detected in step S3, processing proceeds to step S5.

In step S5, the sensing unit 71 outputs the detection result of the pressure distribution sensor 35 and a detection result of the force sensor 37 to the estimation unit 73.

In step S6, the estimation unit 73 acquires the time-series data of the detected values of the pressure distribution sensor 35. Further, the estimation unit 73 estimates detected values of the pressure distribution sensor 35 outside the detection range on the basis of the detection result of the pressure distribution sensor 35 supplied from the sensing unit 71, the detection result of the force sensor 37, and the time-series data acquired from the data storage unit 72.

If detected values of the pressure distribution sensor 35 outside the detection range are estimated in step S6 or if the time-series data is stored in step S4, processing proceeds to step S7. Similarly, when it is determined that a value higher than the threshold value has not been detected by the pressure distribution sensor 35 in step S2, processing proceeds to step S7.

In step S7, the sensing unit 71 determines whether to end processing.

If it is determined that processing is not ended in step S7, processing returns to step S1 and the subsequent processes are performed.

On the other hand, if it is determined that processing is ended in step S7, processing is ended.

As described above, even when values cannot be detected in some cells of the pressure distribution sensor 35, it is possible to estimate detected values of those cells. Therefore, it is possible to use an inexpensive sensor having a narrower detection range rather than a sensor having a desired range in the configuration of the robot 1.

Figure 12:
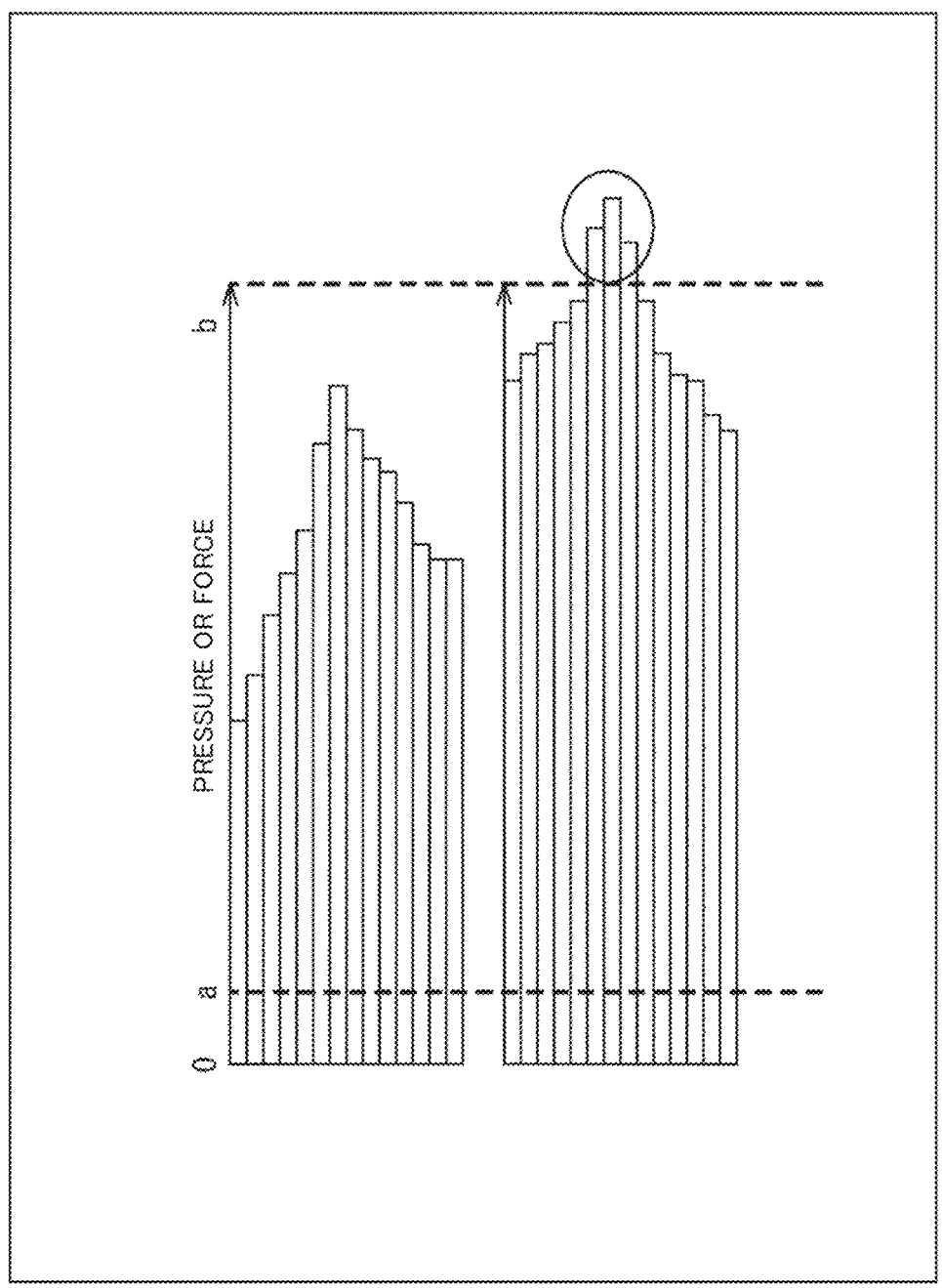
FIG. 12 is a diagram showing an example of a distribution of forces applied to a pressure distribution sensor.

FIG. 12 is a diagram showing an example of a distribution of forces applied to the pressure distribution sensor 35.

In FIG. 12, the horizontal axis represents pressure (force) and the vertical axis represents cells. The same applies to FIG. 13, FIG. 14, and FIG. 15.

In the graph shown in the upper part of FIG. 12, forces within the detection range are applied to all cells of the pressure distribution sensor 35. That is, the pressure distribution sensor 35 can detect forces in all the cells. In the example of FIG. 12, the upper limit of the detection range is set to a value b and the lower limit is set to a value a.

On the other hand, in the graph shown in the lower part of FIG. 12, as represented by an ellipse, forces higher (stronger) than the value b, which is the upper limit of the detection range, are applied to three cells. That is, forces cannot be correctly detected in three of the cells constituting the pressure distribution sensor 35.

Figure 13:
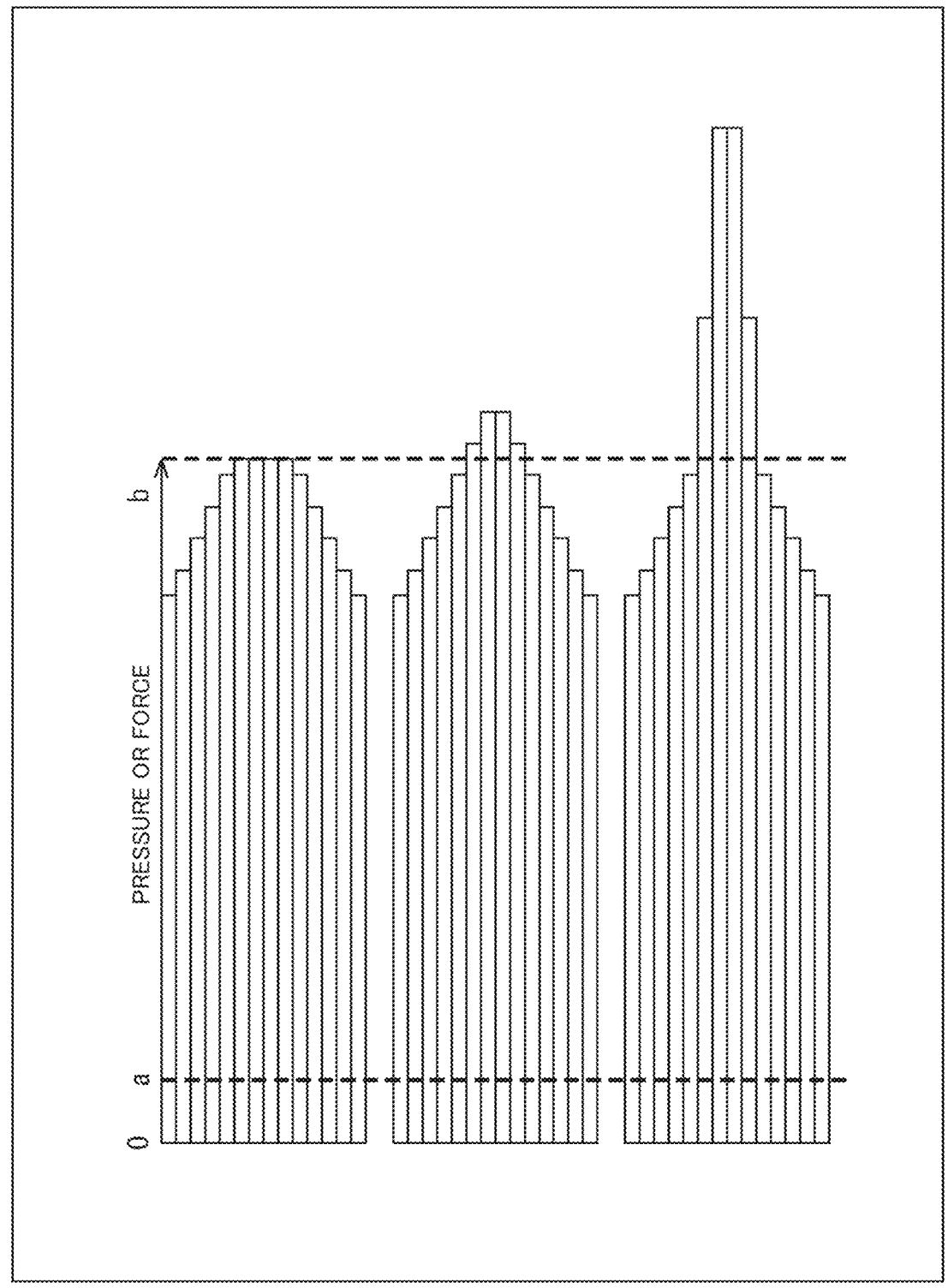
FIG. 13 is a diagram showing an example of detected values of the pressure distribution sensor.

FIG. 13 is a diagram showing an example of detected values of the pressure distribution sensor 35.

The graph shown in the upper part of FIG. 13 shows a detection result of the pressure distribution sensor 35. As shown in the lower part of FIG. 12, detected values of cells to which forces higher than the upper limit value b of the detection range are applied become the upper limit value b.

The graph shown in the middle part of FIG. 13 shows a result when values outside the detection range have been estimated by interpolation based only on the detection result of the pressure distribution sensor 35 without using a detection result of the force sensor 37. For example, predetermined values higher than the value b are estimated on the basis of detection results of surrounding cells, as shown in the middle part of FIG. 13.

The graph shown in the lower part of FIG. 13 shows an example of forces actually applied to the pressure distribution sensor 35. Forces actually applied to the three cells in which detected values are estimated are greater than the forces estimated by interpolation based only on the detection result of the pressure distribution sensor 35 shown in the middle part.

If values outside the detection range are estimated by interpolation based only on the detection result of the pressure distribution sensor 35, it is impossible to handle a situation in which such a non-linear force that cannot be estimated from detection results of surrounding cells is applied. That is, the result of estimation by interpolation based only on the detection result of the pressure distribution sensor 35 may be an uncertain estimation result.

By using the detection result of the force sensor 37 for estimation as described above, the control device 51 can perform highly accurate estimation.

Further, the control device 51 can estimate detected values of one or more cells regardless of the number of cells of the pressure distribution sensor 35 outside the detection range.

Even when a pressure distribution cannot be detected due to a temporary cause such as a communication error between the pressure distribution sensor 35 and the control device 51, the control device 51 can estimate detected values of the pressure distribution sensor 35 on the basis of the detection result of the force sensor and time-series data.

Further, the control device 51 can estimate detected values outside the detection range even when a force lower than the lower limit of the detection range is applied.

States in which values cannot be detected in some cells of the pressure distribution sensor 35 include a state in which forces applied to the cells of the pressure distribution sensor 35 are higher than the upper limit of the detection range of the pressure distribution sensor 35 and a state in which the forces are lower than the lower limit of the detection range of the pressure distribution sensor 35.

Figure 14:
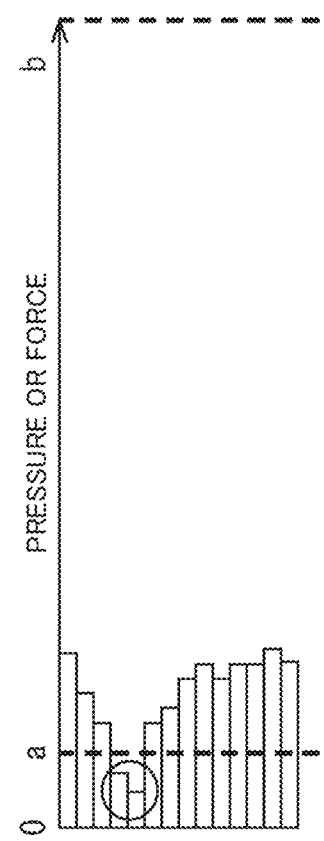
FIG. 14 is a diagram showing another example of a distribution of forces applied to the pressure distribution sensor.

FIG. 14 is a diagram showing another example of a distribution of forces applied to the pressure distribution sensor 35.

In the graph shown in FIG. 14, as represented by a circle, forces lower (weaker) than the value a, which is the lower limit of the detection range, are applied to two cells. That is, forces cannot be correctly detected in two of the cells constituting the pressure distribution sensor 35.

In this case, a force lower than the value a is detected by the pressure distribution sensor 35 as the value a or as an inaccurate value in the range of 0 to the value a.

Estimation of a detected value lower than the lower limit value a is performed in the same manner as estimation of a detected value higher than the upper limit. For example, when a value lower than the threshold value is detected by one or more cells of the pressure distribution sensor 35, the control device 51 stores a detected value of each cell of the pressure distribution sensor 35 at each time as time-series data. A detected value, which is a second threshold value for starting storage of the time-series data, is preset as a value higher than the lower limit of the detection range of the pressure distribution sensor 35.

The control device 51 estimates a detected value lower than the lower limit of the detection range according to ratio calculation using a detected value of a cell which first exceeds the threshold value as a reference value, as described above, on the basis of a detection result of the force sensor 37 at the time when the lower limit value of the detection range is detected by the pressure distribution sensor 35 and time-series data.

In this manner, the control device 51 can estimate not only a detected value higher than the upper limit of the detection range but also a detected value lower than the lower limit of the detection range.

Meanwhile, a detected value outside the detection range of the pressure distribution sensor 35 may be estimated by interpolation based on a detection result of the force sensor 37 and a detection result of the pressure distribution sensor 35.

Figure 15:
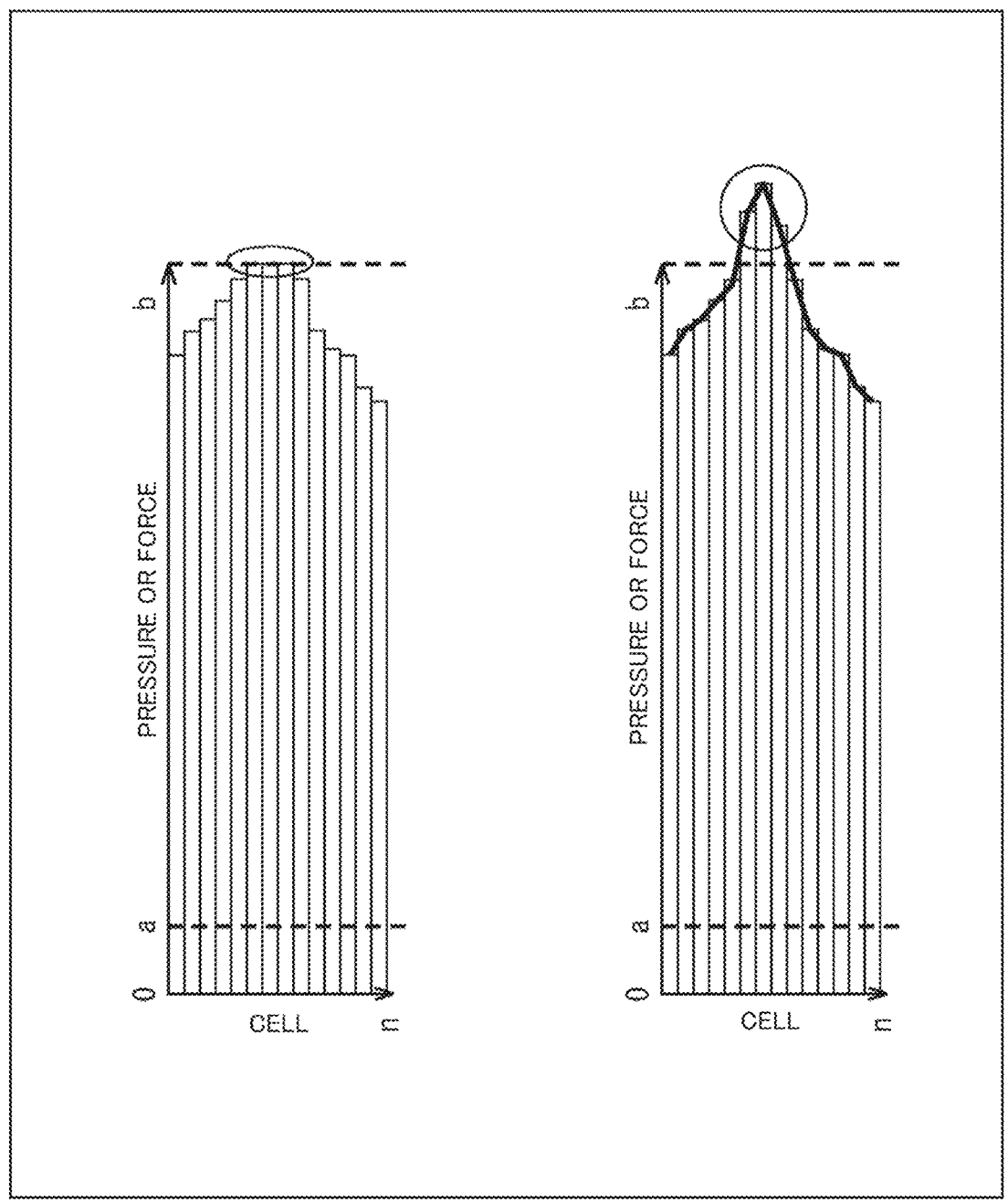
FIG. 15 is a diagram showing an example of interpolation estimation.

FIG. 15 is a diagram showing an example of interpolation estimation.

The upper graph of FIG. 15 is the same as the upper graph of FIG. 13. In the upper graph of FIG. 15, a detected value of a cell to which a force higher than the upper limit of the detection range is applied is the value b. The detected value of the cell in which the upper limit value b is detected is estimated by interpolation.

For example, interpolation of a detected values may be performed by, for example, spline interpolation such that a total force of detected values of the cells of the pressure distribution sensor 35 is consistent with a detected value of the force sensor 37.

The lower graph of FIG. 15 shows detected values of a pressure distribution sensor 35 estimated by interpolation. Values higher than the upper limit of the detection range, represented by being enclosed with a circle, represent the detected values estimated by interpolation.

As described above, it is possible to estimate a value of the pressure distribution sensor 35 outside the detection range on the basis of a detection result of the force sensor 37 at a certain timing without using time-series data.

5. Example Using Prediction Model

Estimation of a detected value of the pressure distribution sensor 35 outside the detection range may be performed using a prediction model.

The prediction model is generated in advance by machine learning using a detection result of the pressure distribution sensor, data obtained by performing predetermined pre-learning processing on the detection result of the pressure distribution sensor, and a detection result of the force sensor. Here, machine learning of the prediction model will be described.

Figure 16:
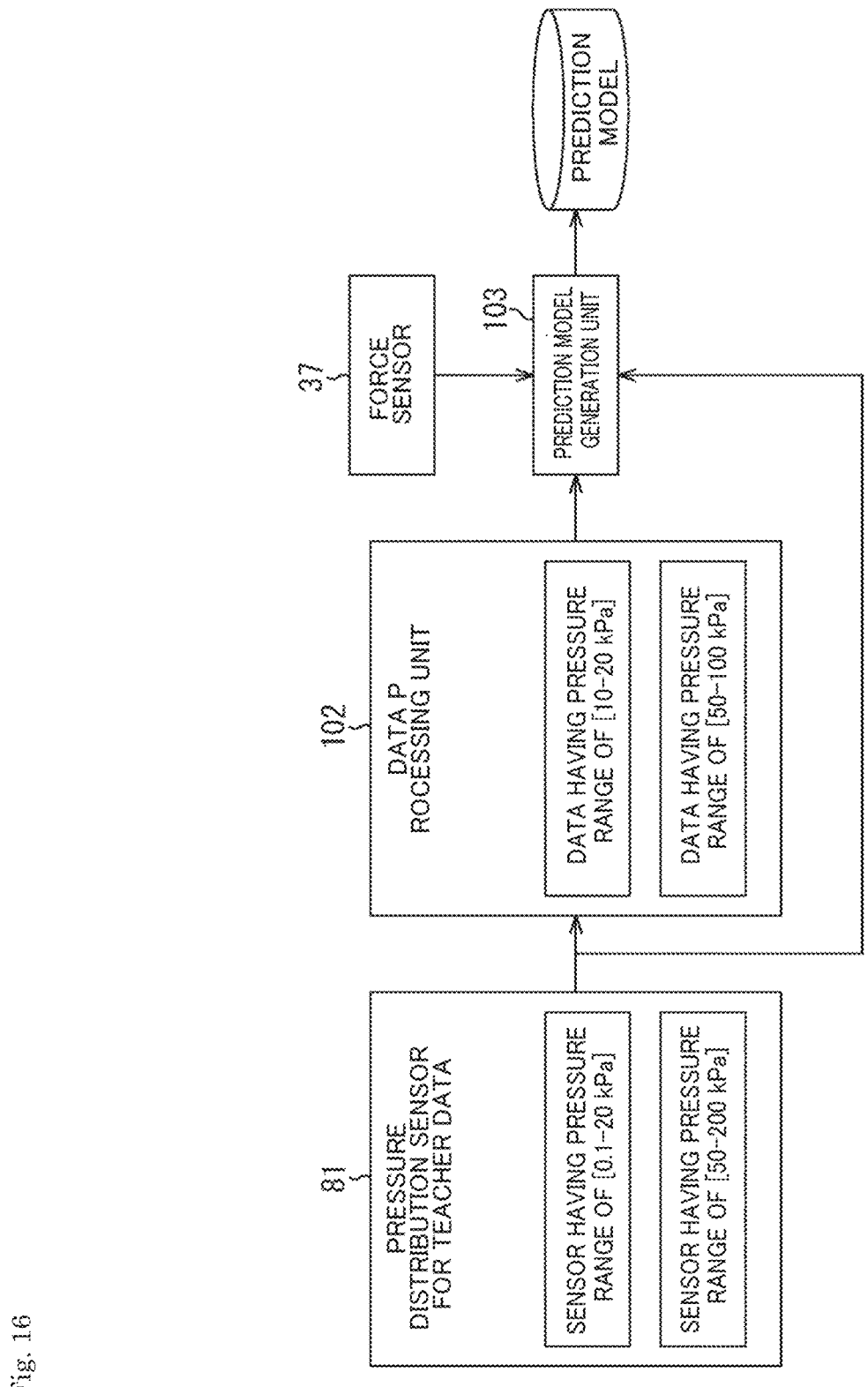
FIG. 16 is a diagram showing an example of a configuration used for machine learning of a prediction model.

FIG. 16 is a diagram showing an example of a configuration used for machine learning of a prediction model.

As shown in FIG. 16, machine learning of the prediction model is performed using the force sensor 37, a pressure distribution sensor 81 for teacher data, a data processing unit 102, and a prediction model generation unit 103. For example, machine learning of the prediction model is performed according to supervised learning using a detection result of the pressure distribution sensor 81 for teacher data as teacher data.

The pressure distribution sensor 81 for teacher data is composed of a plurality of pressure distribution sensors. Each of the pressure distribution sensors constituting the pressure distribution sensor 81 for teacher data is a sensor including a part of the detection range of the pressure distribution sensor 35, which is a pressure distribution sensor to be predicted, in the detection range. Here, it is assumed that the detection range of the pressure distribution sensor 35 is 10 kPa to 100 kPa.

In the example of FIG. 16, a low pressure distribution sensor having a detection range of 0.1 kPa to 20 kPa and a high pressure distribution sensor having a detection range of 50 kPa to 200 kPa are used as the pressure distribution sensor 81 for teacher data. The detection range of the low pressure distribution sensor and the detection range of the high pressure distribution sensor include parts of the detection range of the pressure distribution sensor 35, 10 kPa to 100 kPa. The number of pressure distribution sensors used as the pressure distribution sensor 81 for teacher data is any one or more.

The low pressure distribution sensor and the high pressure distribution sensor are provided in the hand part 14 instead of the pressure distribution sensor 35 in the hand part 14 described with reference to FIG. 2. The pressure distribution sensor 81 for teacher data may be added as a sensor constituting the sensor unit.

The robot 1 collects data by repeating a target task using the hand part provided with the pressure distribution sensor 81 for teacher data in various variations. A detection result of the pressure distribution sensor 81 for teacher data, which is the collected data, is supplied to the data processing unit 102 and the prediction model generation unit 103.

The data processing unit 102 performs pre-learning processing on the detection result of the pressure distribution sensor 81 for teacher data according to the detection range of the pressure distribution sensor 35 to be predicted. Learning data used for learning the prediction model is generated according to the pre-learning processing.

In the example of FIG. 16, some of the detection result of the low pressure distribution sensor are cut in accordance with the detection range of the pressure distribution sensor 35 and thus data having a range of 10 kPa to 20 kPa is generated. Further, some of the detection result of the high pressure distribution sensor are cut in accordance with the detection range of the pressure distribution sensor 35 and thus data having a range of 50 kPa to 100 kPa is generated.

The data generated by the pre-learning processing is supplied to the prediction model generation unit 103. The prediction model generation unit 103 is also supplied with a detection result of the force sensor 37 detected at the same time as the time when the detection result of the pressure distribution sensor 81 for teacher data is detected.

The prediction model generation unit 103 learns parameters constituting a prediction model by using the data after the pre-learning processing and the detection result of the force sensor as learning data and by using the detection result of the pressure distribution sensor 81 for teacher data as teacher data. The prediction model composed of the parameters obtained by learning is used to estimate detected values of the pressure distribution sensor 35 outside the detection range.

Figure 17:
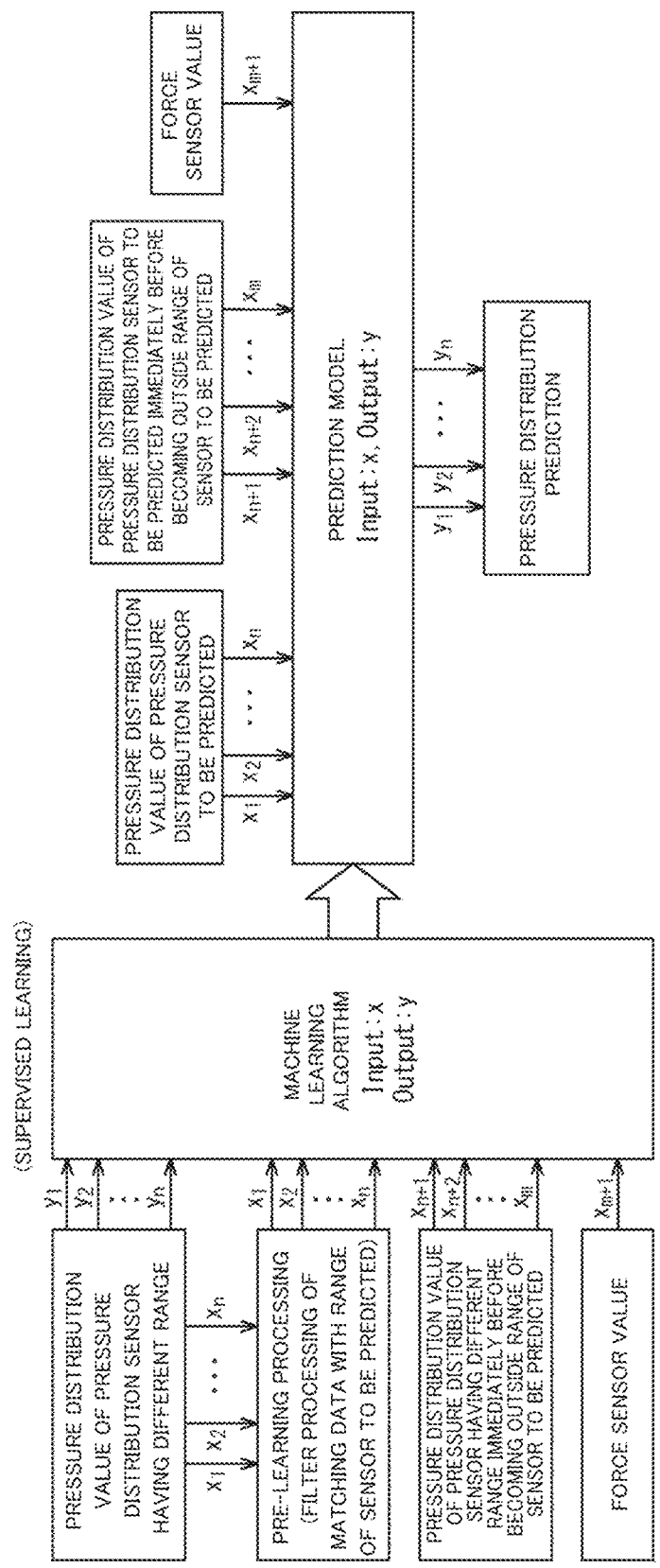
FIG. 17 is a diagram showing input/output of the prediction model.

FIG. 17 is a diagram showing input/output of the prediction model.

The left side of FIG. 17 represents input and output during learning of the prediction model described with reference to FIG. 16 and the right side of FIG. 17 represents input and output during estimation using the prediction model.

As shown on the left side of FIG. 17, machine learning performed in the prediction model generation unit 103 is performed according to a machine learning algorithm that uses pressure distribution values $(y_1, y_2, \ldots, y_n)$ of the pressure distribution sensor 81 for teacher data as teacher data and uses data $(x_1, x_2, \ldots, x_n)$ after pre-learning processing, time-series data $(x_{n+1}, x_{n+2}, \ldots, x_m)$ of detected values of the pressure distribution sensor 81 for teacher data, and a detection result $(x_{m+1})$ of the force sensor as learning data.

The time-series data $(x_{n+1}, x_{n+2}, \ldots, x_m)$ of the detected values of the pressure distribution sensor 81 for teacher data may be, for example, values higher than the first threshold value of the pressure distribution sensor 35 to be predicted or a detection result of the pressure distribution sensor 81 for teacher data at a time when a value lower than the second threshold value is detected.

A detection result of the pressure distribution sensor 81 for teacher data at each time from the time when detection of the pressure distribution sensor 81 for teacher data starts to the time when a value exceeding the detection range of the pressure distribution sensor 35 to be predicted is detected may be used as time-series data of detected values of the pressure distribution sensor 81 for teacher data.

The prediction model generation unit 103 generates a prediction model that receives the learning data as input and outputs pressure distribution values corresponding to the teacher data according to the machine learning algorithm.

On the other hand, as shown on the right side of FIG. 17, when the pressure distribution values ($x_1, x_2, \ldots, x_n$) which are the detection result of the pressure distribution sensor 35, the time-series data ($x_{n+1}, x_{n+2}, \ldots, x_m$) of the detected values of the pressure distribution sensor 35, and the detection result ($x_{m+1}$) of the force sensor 37 are input, predicted values of pressure distribution including detected values of the pressure distribution sensor 35 outside the detection range are output from the prediction model.

Figure 18:
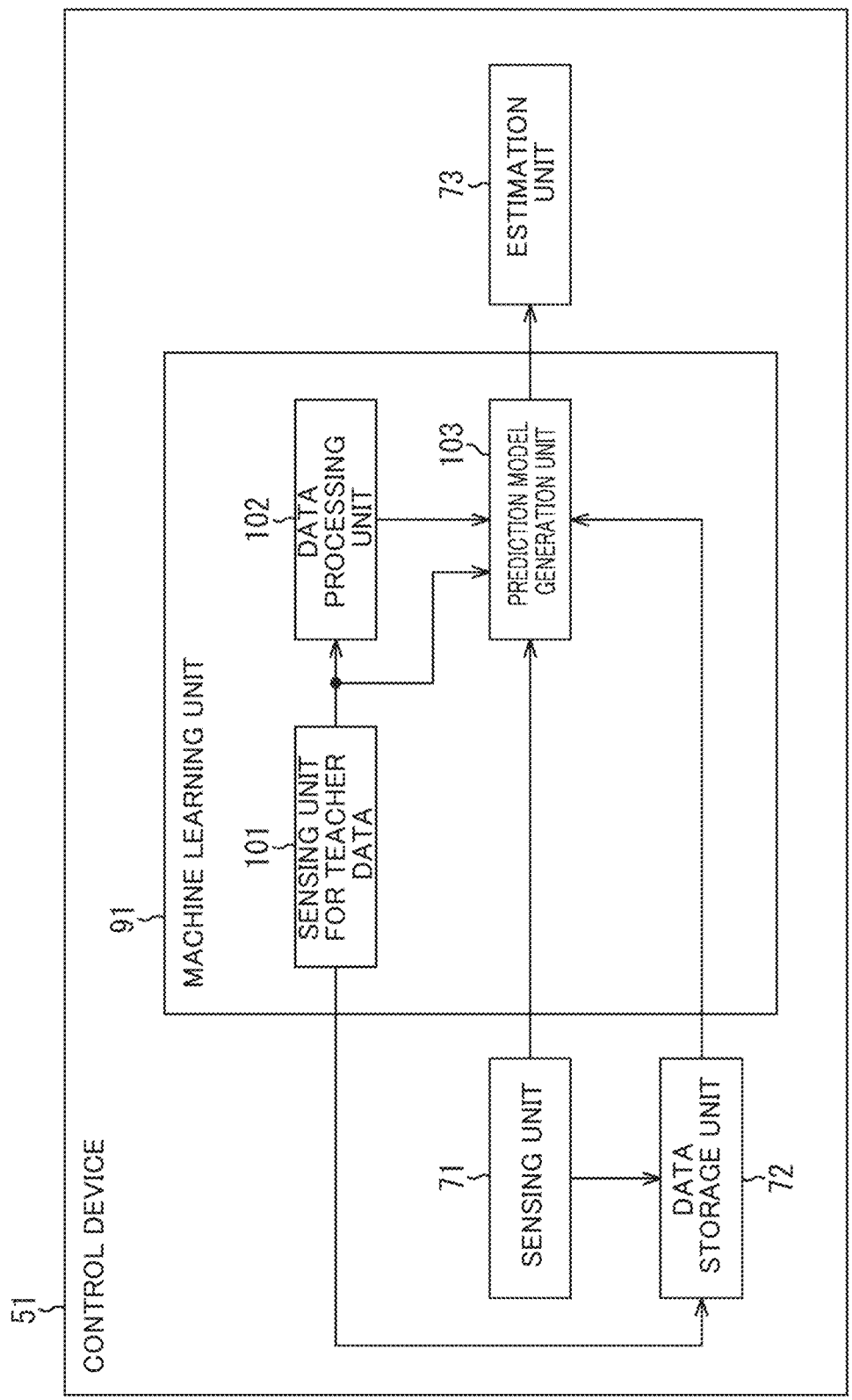
FIG. 18 is a block diagram showing a configuration example of the control device including a learning device.

FIG. 18 is a block diagram showing a configuration example of the control device 51 including a learning device.

The configuration of the control device 51 shown in FIG. 18 is used at the time of learning a prediction model. The control device 51 shown in FIG. 18 is provided with a machine learning unit 91 in addition to the sensing unit 71, the data storage unit 72, and the estimation unit 73 described above.

When a value outside the detection range of the pressure distribution sensor 35, which is the pressure distribution sensor to be predicted, is detected by the pressure distribution sensor 81 for teacher data, the sensing unit 71 outputs a detection result of the force sensor 37 to the machine learning unit 91.

When a value exceeding the threshold value is detected by the pressure distribution sensor 81 for teacher data, a detection result of the force sensor 37 may be output from the sensing unit 71 to the data storage unit 72 and stored therein. In this case, the detection result of the force sensor 37 stored as time-series data is used as learning data at the time of learning the prediction model.

The data storage unit 72 stores a detection result of the pressure distribution sensor 81 for teacher data supplied from a sensing unit 101 for teacher data of the machine learning unit 91 as time-series data.

A prediction model composed of parameters learned using the detection result of the pressure distribution sensor 81 for teacher data is supplied to the estimation unit 73 from the machine learning unit 91. Estimation of detected values of the pressure distribution sensor 35 is performed by the estimation unit 73 using the prediction model.

The machine learning unit 91 includes a sensing unit 101 for teacher data, a data processing unit 102, and a prediction model generation unit 103.

The sensing unit 101 for teacher data acquires the detection result of the pressure distribution sensor 81 for teacher data (not shown).

When a value exceeding the threshold value is detected by the pressure distribution sensor 81 for teacher data, the sensing unit 101 for teacher data outputs the detection result of the pressure distribution sensor 81 for teacher data to the data storage unit 72.

When a value outside the detection range of the pressure distribution sensor to be predicted is detected by the pressure distribution sensor 81 for teacher data, the sensing unit 101 for teacher data outputs the detection result of the pressure distribution sensor 81 for teacher data to the data processing unit 102 and the prediction model generation unit 103.

The data processing unit 102 performs pre-learning processing on the detection result of the pressure distribution sensor 81 for teacher data supplied from the sensing unit 101 for teacher data. The data processing unit 102 outputs the data after pre-learning processing to the prediction model generation unit 103.

When a value outside the detection range of the pressure distribution sensor 35 is detected by the pressure distribution sensor 81 for teacher data, the prediction model generation unit 103 acquires time-series data of detected values of the pressure distribution sensor 81 for teacher data from the data storage unit 72.

The prediction model generation unit 103 performs machine learning using the detection result of the pressure distribution sensor 81 for teacher data supplied from the sensing unit 101 for teacher data as teacher data and using data after pre-learning processing supplied from the data processing unit 102, time-series data of the pressure distribution sensor 81 for teacher data acquired from the data storage unit 72, and the detection result of the force sensor 37 supplied from the sensing unit 71 as learning data.

The prediction model generation unit 103 generates a prediction model on the basis of the result of machine learning and outputs the prediction model to the estimation unit 73.

By using the prediction model generated as described above, the control device 51 can estimate an accurate and wide range pressure distribution.

Although learning of the prediction model that receives the detection result of the pressure distribution sensor 35, the time-series data of the detected values of the pressure distribution sensor 35, and the detection result of the force sensor 37 as inputs and outputs predicted values of pressure distribution is performed and used to estimate a pressure distribution in the above, a prediction model that receives the detection result of the pressure distribution sensor 35 and the time-series data of the detected values of the pressure distribution sensor 35 as inputs and outputs predicted values of pressure distribution may be used.

Learning of this prediction model is performed by the prediction model generation unit 103, for example, using data after pre-learning processing and the time-series data of the detected values of the pressure distribution sensor 81 for teacher data as learning data.

6. Modified Examples

Force Sensor

The sensor unit may be configured by stacking a plurality of force sensors on the pressure distribution sensor 35. In this case, the plurality of force sensors are arranged in parallel on the same plane.

Figure 19:
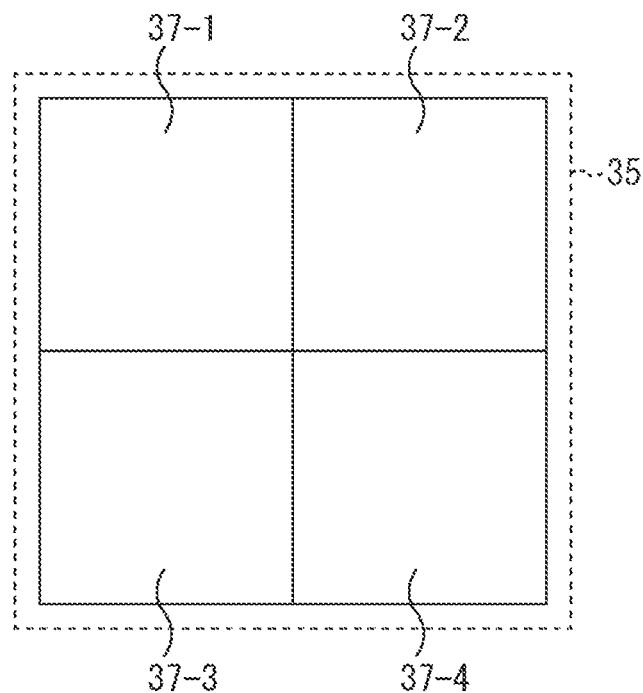
FIG. 19 is a diagram showing a configuration example of a sensor unit.

FIG. 19 is a diagram showing a configuration example of a sensor unit.

In the example of FIG. 19, approximately square force sensors 37-1 to 37-4 are arranged in parallel on the same plane so as to form 2×2 (vertical×horizontal) tiles.

The force sensors 37-1 to 37-4 are coupled to the approximately square pressure distribution sensor 35 represented by a broken line to form a sensor unit.

In this case, since a detected value of each cell included in sections of the corresponding pressure distribution sensor 35 can be estimated on the basis of a force applied to each of the force sensors 37-1 to 37-4, it is possible to perform estimation with higher accuracy.

Further, a detected value of a moment of a 6-axis force sensor may be used to estimate a detected value of the pressure distribution sensor 35 outside the detection range. In this case, it is possible to perform estimation with higher accuracy.

Applicable Sensors

The sensor unit and the control device 51 having the above configurations can be applied to all devices that detect a pressure distribution. The sensor unit and the control device 51 can be applied to, for example, a medical examination device and a leg measuring device during walking.

The sensor unit may be composed of a sensor that detects a physical phenomenon other than pressure. For example, a temperature distribution sensor and a temperature sensor can be used as sensors constituting the sensor unit. Further, it is possible to use a barometric pressure distribution sensor and a barometric pressure sensor.

Adjustment of Gain of Pressure Distribution Sensor

A detection result of the force sensor may be used to adjust the gain of the pressure distribution sensor. In this case, the control device 51 sets the gain of the pressure distribution sensor based on the detection result of the force sensor. The gain of the entire pressure distribution sensor may be set or the gain may be set for each cell of the pressure distribution sensor.

The detection cycle of the force sensor is shorter than the detection cycle of the pressure distribution sensor. Further, the amount of data processing required to acquire the detection result of the force sensor is less than the amount of data processing required to acquire the detection result of the pressure distribution sensor. Therefore, it is possible to adjust the gain of the pressure distribution sensor without affecting the data acquisition cycle of the pressure distribution sensor.

In adjustment of the gain of the pressure distribution sensor, a detection result of a sensor capable of detecting a large external force may be used instead of the detection result of the force sensor. For example, it is possible to use a detection result of any of an acceleration sensor, a proximity sensor, a camera, and a temperature sensor.

Example of Detection Range

As the detection range of the force sensor, various ranges including a range outside the detection range of the pressure distribution sensor can be set.

Figure 20:
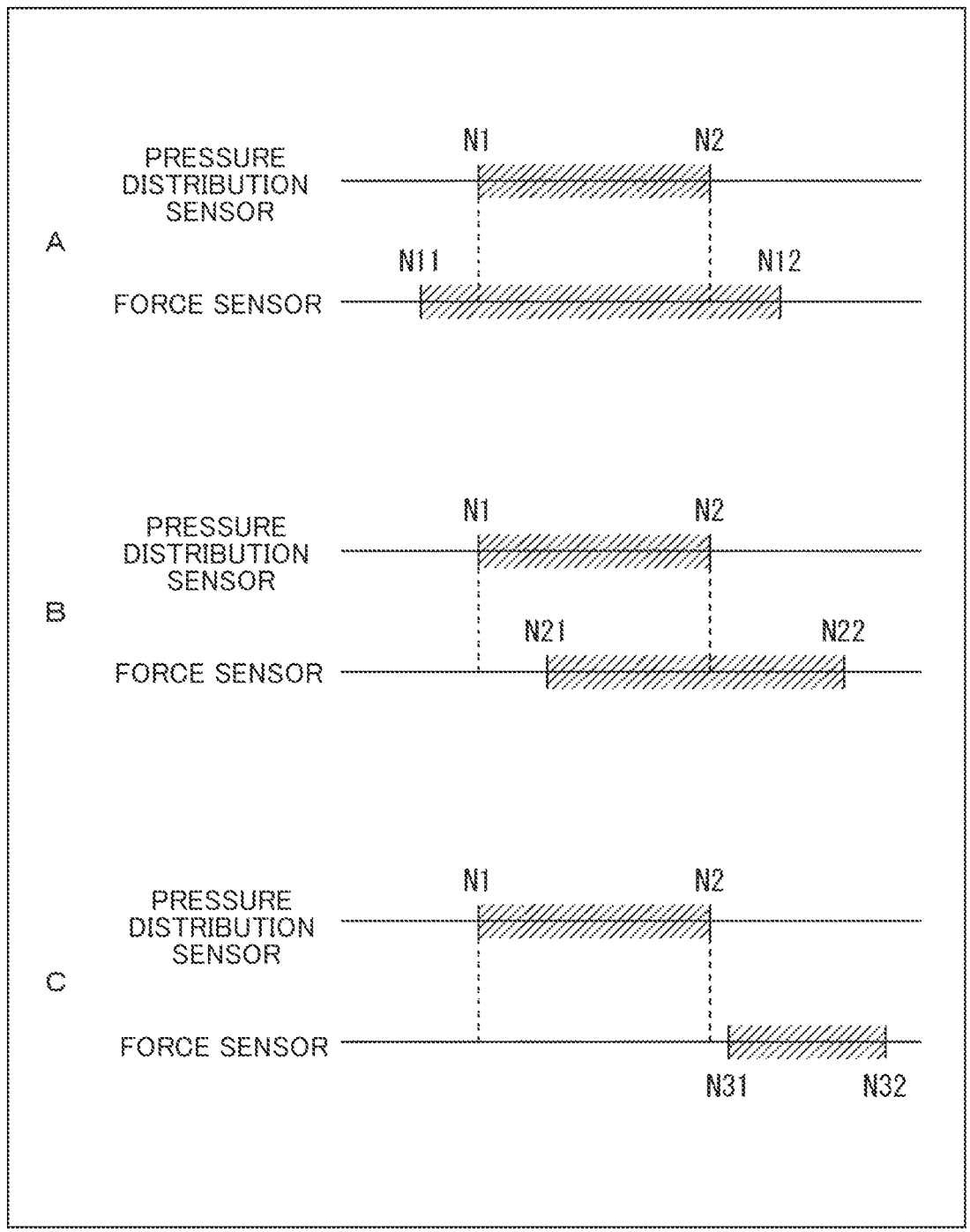
FIG. 20 is a diagram showing examples of a detection range.

FIG. 20 is a diagram showing examples of a detection range.

A of FIG. 20 shows an example in which a range exceeding both the upper limit and the lower limit of the detection range of the pressure distribution sensor is included in the detection range of the force sensor.

In A of FIG. 20, the lower limit of the detection range of the pressure distribution sensor is represented by a value N1 and the upper limit is represented by a value N2. On the other hand, the lower limit of the detection range of the force sensor is represented by a value N11 lower than the value N1 and the upper limit is represented by a value N12 higher than the value N2.

Accordingly, it is possible to estimate a detected value that exceeds both the upper and lower limits of the detection range of the pressure distribution sensor on the basis of a detection result of the force sensor.

B of FIG. 20 shows an example in which a range exceeding the upper limit of the detection range of the pressure distribution sensor is included in the detection range of the force sensor. The detection range of the force sensor also includes a part of the detection range of the pressure distribution sensor.

In B of FIG. 20, the lower limit of the detection range of the pressure distribution sensor is represented by the value N1 and the upper limit is represented by the value N2. On the other hand, the lower limit of the detection range of the force sensor is represented by a value N21 higher than the value N1 and lower than the value N2 and the upper limit is represented by a value N22 higher than the value N2.

Accordingly, it is possible to estimate a detected value that exceeds the upper limit of the detection range of the pressure distribution sensor on the basis of a detection result of the force sensor.

The detection range of the force sensor may be set such that a detected value exceeding the lower limit of the detection range of the pressure distribution sensor can be estimated on the basis of a detection result of the force sensor.

In this manner, a detected value exceeding one of the upper limit and the lower limit of the detection range of the pressure distribution sensor may be estimated on the basis of a detection result of the force sensor. In this case, the time-series data of the detected values of the pressure distribution sensor described above is stored when a value higher than the first threshold value set as a value lower than the upper limit of the detection range is detected or a detected value lower than the second threshold value set as a value higher than the lower limit is detected.

C of FIG. 20 shows an example in which only a range exceeding the upper limit of the detection range of the pressure distribution sensor is included in the detection range of the force sensor. The detection range of the force sensor does not include the detection range of the pressure distribution sensor.

In C of FIG. 20, the lower limit of the detection range of the pressure distribution sensor is represented by the value N1 and the upper limit is represented by the value N2. On the other hand, the lower limit of the detection range of the force sensor is represented by a value N31 higher than the value N2 and the upper limit is represented by a value N32.

This also makes it possible to estimate a detected value exceeding the upper limit of the detection range of the pressure distribution sensor on the basis of a detection result of the force sensor.

In this manner, a range including only a range outside the detection range of the pressure distribution sensor may be set as the detection range of the force sensor.

Example of Computer

The series of processing described above can be executed by hardware or software. When the series of processing is performed by software, a program for the software is embedded in dedicated hardware to be installed from a program recording medium to a computer incorporated in dedicated hardware or a general-purpose personal computer, etc.

Figure 21:
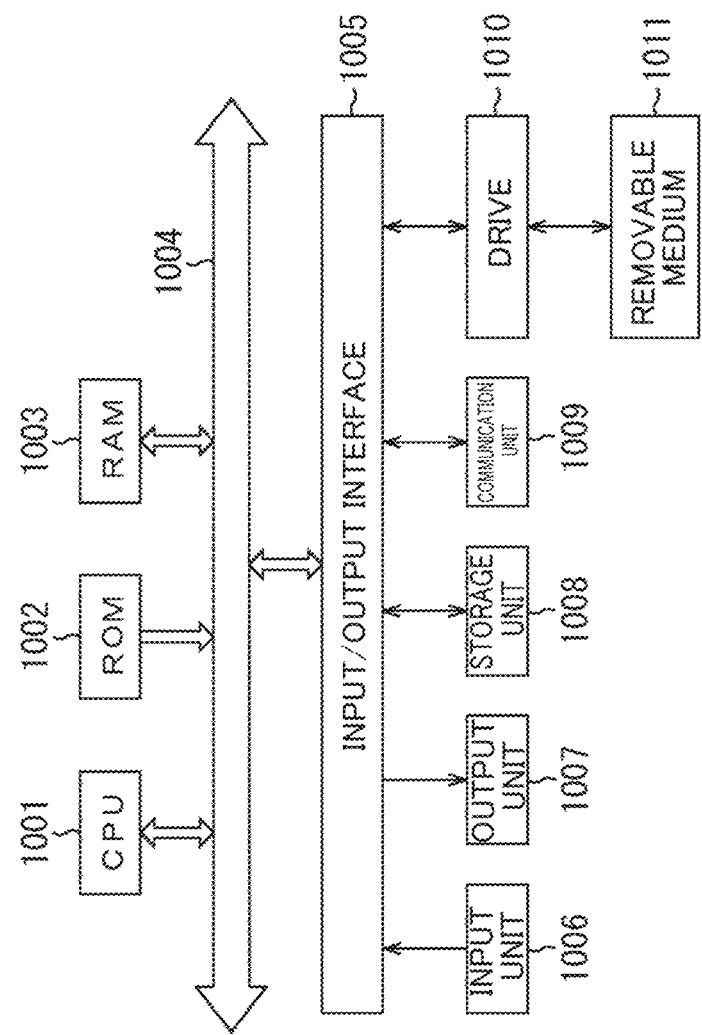
FIG. 21 is a block diagram showing a hardware configuration example of a computer.

FIG. 21 is a block diagram showing a hardware configuration example of a computer that executes a program to perform the above-described series of processing.

A central processing unit (CPU) 1001, a read-only memory (ROM) 1002, and a random access memory (RAM) 1003 are connected to each other via a bus 1004.

An input/output interface 1005 is further connected to the bus 1004. An input unit 1006 including a keyboard and a mouse and an output unit 1007 including a display and a speaker are connected to the input/output interface 1005. A storage unit 1008 including a hard disk, a nonvolatile memory, or the like, a communication unit 1009 including a network interface or the like, a drive 1010 driving a removable medium 1011 are connected to the input/output interface 1005.

In the computer having such a configuration, for example, the CPU 1001 loads a program stored in the storage unit 1008 to the RAM 1003 via the input/output interface 1005 and the bus 1004 and executes the program to perform the above-described series of processing.

The program executed by the CPU 1001 is recorded on, for example, the removable medium 1011 or is provided via a wired or wireless transfer medium such as a local area network, the Internet, a digital broadcast to be installed in the storage unit 1008.

The program executed by the computer may be a program that performs processing chronologically in the procedure described in the present specification or may be a program that performs processing at a necessary timing such as in parallel or upon being called.

The advantages described in the present specification are merely exemplary and not limited, and other advantages may be obtained.

Embodiments of the present technology are not limited to the above-described embodiments, and various modifications can be made without departing from the gist of the present technology.

For example, the present technology can be configured as cloud computing in which one function is shared and processed in common by a plurality of devices via a network.

Further, the respective steps described in the above-described flowchart can be executed by one device or in a shared manner by a plurality of devices.

Furthermore, in a case where a plurality of kinds of processing are included in a single step, the plurality of kinds of processing included in the single step may be executed by one device or by a plurality of devices in a shared manner.

Combination Examples of Configurations

The present technology can be configured as follows.

(1)

An information processing device including an acquisition unit configured to acquire detection results of a sensor unit composed of a plurality of sensors including a first sensor having a predetermined detection range, and a second sensor having a range in a detection range thereof in which detection by the first sensor is not possible, and an estimation unit configured to estimate a detected value of the first sensor outside the predetermined detection range on the basis of detection results of the second sensor.

(2)

The information processing device according to (1), wherein the second sensor is a sensor having a detection range wider than the predetermined detection range of the first sensor.

(3)

The information processing device according to (1) or (2), wherein the first sensor is a pressure distribution sensor, and the second sensor is a force sensor.

(4)

The information processing device according to any one of (1) to (3), wherein the estimation unit estimates the detected value of the first sensor outside the predetermined detection range on the basis of time-series data of detected values of the first sensor.

(5)

The information processing device according to (4), wherein the estimation unit estimates a detected value of each position of the first sensor which is outside the predetermined detection range according to a ratio of a detected value of each position of the first sensor before becoming outside the predetermined detection range.

(6)

The information processing device according to (4) or (5), further including a storage unit configured to, when a detected value higher than a first threshold value set as a value lower than an upper limit of the predetermined detection range is detected by the first sensor, store the detected value of the first sensor, wherein the estimation unit estimates a detected value of the first sensor higher than the upper limit on the basis of the time-series data that is time-series of detected values stored in the storage unit.

(7)

The information processing device according to (6), wherein, when a detected value of the first sensor lower than a second threshold value set as a value higher than a lower limit of the predetermined detection range is detected by the first sensor, the storage unit stores the detected value of the first sensor, and the estimation unit estimates a detected value of the first sensor lower than the lower limit on the basis of the time-series data.

(8)

The information processing device according to (7), wherein the storage unit stores a detected value of the second sensor in at least any of a case where a detected value higher than the first threshold value is detected by the first sensor and a case where a detected value lower than the second threshold value is detected by the first sensor.

(9)

The information processing device according to any one of (1) to (3), wherein the estimation unit estimates a detected value of the first sensor outside the predetermined detection range by interpolation according to the detection result of the second sensor.

(10)

The information processing device according to any one of (1) to (9), wherein the sensor unit is formed by stacking a plurality of sensors.

(11)

The information processing device according to (10), wherein the first sensor is provided at a position closer to the surface of the sensor unit than the second sensor with or without a mounting part sandwiched between the first sensor and the second sensor.

(12)

The information processing device according to (7) or (8), wherein the acquisition unit stops operation of the second sensor until a detected value higher than the first threshold value is detected by the first sensor or a detected value lower than the second threshold value is detected by the first sensor.

(13)

The information processing device according to any one of (1) to (12), wherein the estimation unit estimates a detected value of the first sensor outside the predetermined detection range using a prediction model that receives a detected value of the first sensor and a detected value of the second sensor as inputs and outputs a detected value of the first sensor outside the predetermined detection range.

(14)

The information processing device according to (13), further including a prediction model generation unit configured to learn parameters constituting the prediction model.

(15)

The information processing device according to (14), wherein the prediction model generation unit learns the parameters by learning using a detection result of a sensor having a range in a detection range thereof in which detection by the first sensor is not possible.

(16)
The information processing device according to any one of (1) to (12), wherein the estimation unit estimates a detected value of the first sensor outside the predetermined detection range using a prediction model that receives a detected value of the first sensor as input and outputs a detected value of the first sensor outside the predetermined detection range.

(17)
An information processing method, using an information processing device, including
acquiring detection results of a sensor unit composed of a plurality of sensors including a first sensor having a predetermined detection range, and a second sensor having a range in a detection range thereof in which detection by the first sensor is not possible, and
estimating a detected value of the first sensor outside the predetermined detection range on the basis of detection results of the second sensor.

(18)
A program causing a computer to execute processing of
acquiring detection results of a sensor unit composed of a plurality of sensors including a first sensor having a predetermined detection range, and a second sensor having a range in a detection range thereof in which detection by the first sensor is not possible, and
estimating a detected value of the first sensor outside the predetermined detection range on the basis of detection results of the second sensor.

(19)
A robot including a hand part capable of gripping an object,
a sensor unit composed of a plurality of sensors including a first sensor having a predetermined detection range and a second sensor having a range in a detection range thereof in which detection by the first sensor is not possible and provided in the hand part, and
an estimation unit configured to estimate a detected value of the first sensor outside the predetermined detection range on the basis of detection results of the second sensor.

REFERENCE SIGNS LIST

1 Robot
11 Body part
12 Head part
13-1, 13-2 Arm part
14-1, 14-2 Hand part
15 Moving body part
35-1, 35-2 Pressure distribution sensor
36-1, 36-2 Intermediate mounting plate
37 Force sensor
51 Control device
71 Sensing unit
72 Data storage unit
73 Estimation unit
81 Pressure distribution sensor for teacher data
91 Machine learning unit
101 Sensing unit for teacher data
102 Data processing unit
103 Prediction model generation unit

The invention claimed is:
1. An information processing device comprising circuitry configured to
acquire detection results of a sensor unit composed of a plurality of sensors including a first sensor having a predetermined detection range, and a second sensor having a range in a detection range thereof in which detection by the first sensor is not possible, and
estimate a detected value of the first sensor outside the predetermined detection range on a basis of detection results of the second sensor,
wherein the sensor unit is formed by stacking the plurality of sensors in a hand part of a robot, the hand part being capable of gripping an object, and
wherein the circuitry is further configured to control the hand part to grip the object based on the detected value of the first sensor being outside the predetermined detection range.

2. The information processing device according to claim 1, wherein the second sensor is a sensor having a detection range wider than the predetermined detection range of the first sensor.

3. The information processing device according to claim 1, wherein the first sensor is a pressure distribution sensor, and
the second sensor is a force sensor.

4. The information processing device according to claim 1, wherein the circuitry is further configured to estimate the detected value of the first sensor outside the predetermined detection range on a basis of time-series data of detected values of the first sensor.

5. The information processing device according to claim 4, wherein the circuitry is further configured to estimate a detected value of each position of the first sensor which is outside the predetermined detection range according to a ratio of a detected value of each position of the first sensor before becoming outside the predetermined detection range to a reference value.

6. The information processing device according to claim 4, further including a storage configured to, when a detected value higher than a first threshold value set as a value lower than an upper limit of the predetermined detection range is detected by the first sensor, store the detected value of the first sensor,
wherein the circuitry is further configured to estimate a detected value of the first sensor higher than the upper limit on the basis of the time-series data that is time-series of detected values stored in the storage.

7. The information processing device according to claim 6, wherein, when a detected value of the first sensor lower than a second threshold value set as a value higher than a lower limit of the predetermined detection range is detected by the first sensor, the storage stores the detected value of the first sensor, and
the circuitry is further configured to estimate a detected value of the first sensor lower than the lower limit on the basis of the time-series data.

8. The information processing device according to claim 7, wherein the storage stores a detected value of the second sensor in at least any of a case where a detected value higher than the first threshold value is detected by the first sensor and a case where a detected value lower than the second threshold value is detected by the first sensor.

9. The information processing device according to claim 1, wherein the circuitry is further configured to estimate a detected value of the first sensor outside the predetermined detection range by interpolation according to the detection results of the second sensor.

10. The information processing device according to claim 1, wherein the first sensor is provided at a position closer to a surface of the sensor unit than the second sensor with or without a mounting part sandwiched between the first sensor and the second sensor.

11. The information processing device according to claim 7, wherein the circuitry is further configured to stop operation of the second sensor until a detected value higher than the first threshold value is detected by the first sensor or a detected value lower than the second threshold value is detected by the first sensor.

12. The information processing device according to claim 1, wherein the circuitry is further configured to estimate a detected value of the first sensor outside the predetermined detection range using a prediction model that receives a detected value of the first sensor and a detected value of the second sensor as inputs and outputs a detected value of the first sensor outside the predetermined detection range.

13. The information processing device according to claim 12, wherein the circuitry is further configured to learn parameters constituting the prediction model.

14. The information processing device according to claim 13, wherein the circuitry is further configured to learn the parameters by learning using a detection result of a sensor having a range in a detection range thereof in which detection by the first sensor is not possible.

15. The information processing device according to claim 1, wherein the circuitry is further configured to estimate a detected value of the first sensor outside the predetermined detection range using a prediction model that receives a detected value of the first sensor as input and outputs a detected value of the first sensor outside the predetermined detection range.

16. An information processing method, using an information processing device, comprising:
  acquiring detection results of a sensor unit composed of a plurality of sensors including a first sensor having a predetermined detection range, and a second sensor having a range in a detection range thereof in which detection by the first sensor is not possible;
  estimating a detected value of the first sensor outside the predetermined detection range on a basis of detection results of the second sensor,
  wherein the sensor unit is formed by stacking the plurality of sensors in a hand part of a robot, the hand part being capable of gripping an object; and
  controlling the hand part to grip the object based on the detected value of the first sensor being outside the predetermined detection range.

17. A non-transitory computer-readable medium having embodied thereon a program, which when executed by a computer causes the computer to execute an information processing method, the method comprising:
  acquiring detection results of a sensor unit composed of a plurality of sensors including a first sensor having a predetermined detection range, and a second sensor having a range in a detection range thereof in which detection by the first sensor is not possible;
  estimating a detected value of the first sensor outside the predetermined detection range on a basis of detection results of the second sensor,
  wherein the sensor unit is formed by stacking the plurality of sensors in a hand part of a robot, the hand part being capable of gripping an object; and
  controlling the hand part to grip the object based on the detected value of the first sensor being outside the predetermined detection range.

18. A robot comprising:
  a hand part capable of gripping an object;
  a sensor unit composed of a plurality of sensors including a first sensor having a predetermined detection range and a second sensor having a range in a detection range thereof in which detection by the first sensor is not possible and provided in the hand part; and
  an estimation unit circuitry configured to estimate a detected value of the first sensor outside the predetermined detection range on a basis of detection results of the second sensor,
  wherein the sensor unit is formed by stacking the plurality of sensors in the hand part, and
  wherein the circuitry is further configured to control the hand part to grip the object based on the detected value of the first sensor being outside the predetermined detection range.

* * * * *